(12) United States Patent
Walcot et al.

(10) Patent No.: US 8,632,271 B2
(45) Date of Patent: Jan. 21, 2014

(54) PAINTING APPARATUS

(75) Inventors: Ruth Elizabeth Walcot, Bury St Edmunds (GB); Michael Roger Cane, Riverside (GB); Christopher John Ord, Hills Rd (GB)

(73) Assignee: Akzo Nobel Coatings International B.V., Arnhem (NL)

( * ) Notice: Subject to any disclaimer, the term of this patent is extended or adjusted under 35 U.S.C. 154(b) by 872 days.

(21) Appl. No.: 12/596,409

(22) PCT Filed: Apr. 4, 2008

(86) PCT No.: PCT/IB2008/001466
§ 371 (c)(1),
(2), (4) Date: Apr. 2, 2010

(87) PCT Pub. No.: WO2008/125980
PCT Pub. Date: Oct. 23, 2008

(65) Prior Publication Data
US 2010/0180816 A1    Jul. 22, 2010

(30) Foreign Application Priority Data

Apr. 17, 2007 (GB) .................................. 0707352.1
Aug. 30, 2007 (GB) .................................. 0716738.0
Jan. 11, 2008 (GB) .................................. 0800511.8
Jan. 25, 2008 (GB) .................................. 0801372.4

(51) Int. Cl.
*B43M 11/02* (2006.01)

(52) U.S. Cl.
USPC ............. 401/218; 401/15; 401/219; 401/220; 401/125; 401/191

(58) Field of Classification Search
USPC ........... 401/218–220, 15, 125, 191, 197, 208; 118/203
See application file for complete search history.

(56) References Cited

U.S. PATENT DOCUMENTS 2,411,842 A    12/1946    Adams
2,536,291 A    1/1951    Kaitul
(Continued)

FOREIGN PATENT DOCUMENTS

AU    88143/82    3/1983
DE    646 808    6/1937
(Continued)

OTHER PUBLICATIONS

International Search Report and Written Opinion, International Application No. PCT/IB2008/001468, mailed Feb. 4, 2009.
(Continued)

*Primary Examiner* — David J. Walczak
*Assistant Examiner* — Bradley Oliver
(74) *Attorney, Agent, or Firm* — Kenyon & Kenyon LLP

(57) ABSTRACT

A painting apparatus comprising a paint module, an applicator assembly having an applicator surface, and a pump, the paint module having a container receiving section, the applicator assembly being fluidly connectable to the container receiving section such that the pump can supply liquid contained in the container receiving section to the applicator assembly, in which the apparatus can operate in a painting cycle where the container receiving section receives a paint container with a supply of paint such that the paint can be supplied to the applicator assembly, and in a cleaning cycle where the container receiving section receives a liquid in the form of a cleaning fluid, such that the cleaning fluid can be supplied to the applicator assembly (FIG. 1).

13 Claims, 38 Drawing Sheets

(56) References Cited

U.S. PATENT DOCUMENTS

Figure 1:
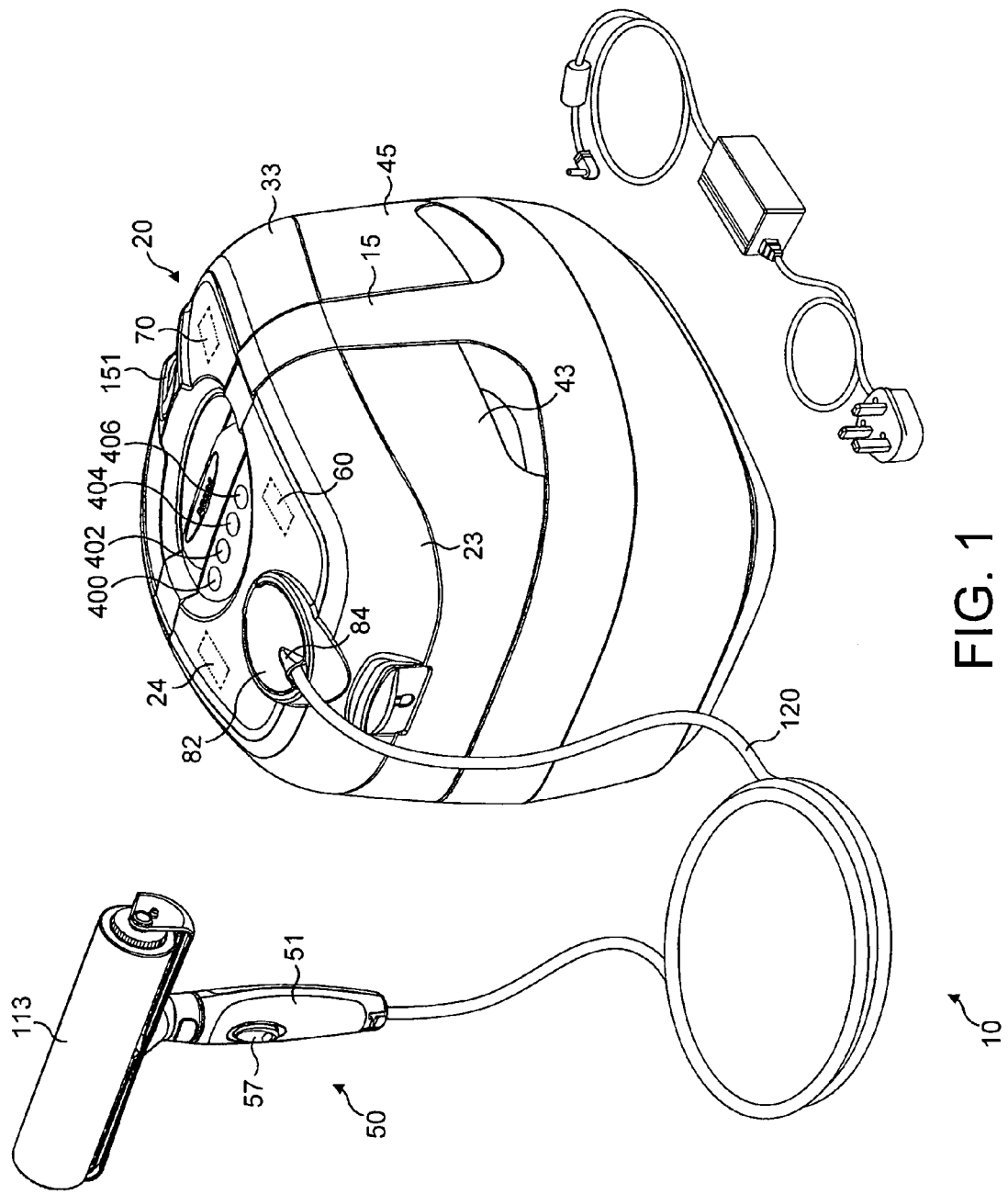

| | | |
|---|---|---|
| 2,846,123 A | 8/1958 | Gray |
| 2,895,154 A | 7/1959 | Daniel |
| 3,128,494 A | 4/1964 | Hohmann |
| 3,173,584 A | 3/1965 | Giavasis |
| 3,192,554 A | 7/1965 | Karkut |
| 3,431,574 A | 3/1969 | Mathieu |
| 3,608,120 A | 9/1971 | Seiler |
| 3,977,797 A | 8/1976 | Paterson |
| 3,993,250 A | 11/1976 | Shure |
| 4,175,300 A | 11/1979 | McGlew et al. |
| 4,422,789 A | 12/1983 | Charney et al. |
| 4,424,011 A | 1/1984 | O'Brien et al. |
| 4,435,099 A | 3/1984 | Murahara |
| 4,537,522 A | 8/1985 | Charney et al. |
| 4,588,318 A * | 5/1986 | O'Brien et al. ............ 401/146 |
| 4,597,684 A | 7/1986 | O'Brien et al. |
| 4,661,045 A | 4/1987 | Winston et al. |
| 4,667,363 A | 5/1987 | Calvert |
| 4,928,846 A | 5/1990 | Murrin |
| 5,002,985 A | 3/1991 | Andersson |
| 5,054,947 A | 10/1991 | Frank et al. |
| 5,090,084 A | 2/1992 | De Guzman |
| 5,212,869 A | 5/1993 | Zacharchuk |
| 5,269,438 A | 12/1993 | Kelsey |
| 5,303,446 A | 4/1994 | Maresh |
| 5,931,595 A | 8/1999 | Van Oost |
| 5,997,205 A | 12/1999 | Koide |
| 6,129,125 A | 10/2000 | Duchon et al. |
| 6,659,007 B1 * | 12/2003 | Winston ............ 401/218 |
| 2002/0071708 A1 | 6/2002 | Fontanet |
| 2002/0079326 A1 | 6/2002 | Fuchs |
| 2004/0175407 A1 | 9/2004 | McDaniel |
| 2005/0017012 A1 | 1/2005 | Hodge |
| 2005/0232684 A1 | 10/2005 | Giacomo |
| 2005/0241095 A1 | 11/2005 | Olson |
| 2005/0258176 A1 | 11/2005 | Shanabrook |
| 2007/0134050 A1 | 6/2007 | Bruggeman et al. |
| 2007/0272707 A1 | 11/2007 | Peralta et al. |

FOREIGN PATENT DOCUMENTS

| | | |
|---|---|---|
| DE | 30 33 600 | 4/1982 |
| DE | 41 13 041 | 11/1992 |
| DE | 10 2007 022 980 | 12/2007 |
| EP | 0 033 790 | 8/1981 |
| EP | 0 339 712 | 11/1989 |
| EP | 0 687 507 | 12/1995 |
| EP | 0 979 850 | 2/2000 |
| EP | 1 541 643 | 6/2005 |
| EP | 1 568 740 | 8/2005 |
| FR | 1 465 417 | 1/1967 |
| FR | 2 170 306 | 9/1973 |
| FR | 2 680 119 | 2/1993 |
| GB | 277 966 | 12/1927 |
| GB | 966838 | 8/1964 |
| GB | 1 260 762 | 1/1972 |
| WO | WO 90/11228 | 10/1990 |
| WO | WO 91/03331 | 3/1991 |
| WO | WO 02/14082 | 2/2002 |
| WO | WO 03/099462 | 12/2003 |
| WO | WO 2007/005496 | 1/2007 |
| WO | WO 2007/067558 | 6/2007 |
| WO | WO 2007/108981 | 9/2007 |
| WO | WO 2007/134044 | 11/2007 |
| WO | WO 2008/125977 | 10/2008 |
| WO | WO 2008/125978 | 10/2008 |
| WO | WO 2008/125979 | 10/2008 |
| WO | WO 2008/125981 | 10/2008 |
| WO | WO 2008/125982 | 10/2008 |

OTHER PUBLICATIONS

International Preliminary Report on Patentability, International Application No. PCT/IB2008/001468, mailed Oct. 20, 2009.
International Search Report and Written Opinion, International Application No. PCT/IB2008/001466, mailed Feb. 12, 2009.
International Preliminary Report on Patentability, International Application No. PCT/IB2008/001466, mailed Oct. 20, 2009.
International Search Report and Written Opinion, International Application No. PCT/IB2008/001469, mailed Nov. 28, 2008.
International Preliminary Report on Patentability, International Application No. PCT/IB2008/001469, mailed Oct. 20, 2009.
International Search Report and Written Opinion, International Application No. PCT/IB2008/001452, mailed Aug. 7, 2009.
International Preliminary Report on Patentability, International Application No. PCT/IB2008/001452, mailed Oct. 20, 2009.
International Search Report and Written Opinion, International Application No. PCT/IB2008/001445, mailed Feb. 23, 2009.
International Preliminary Report on Patentability, International Application No. PCT/IB2008/001445, mailed Oct. 20, 2009.
International Search Report and Written Opinion, International Application No. PCT/IB2008/001453, mailed Feb. 4, 2009.
International Preliminary Report on Patentability, International Application No. PCT/IB2008/001453, mailed Oct. 20, 2009.

* cited by examiner

PAINTING APPARATUS

The present invention relates to a painting apparatus, a roller assembly for use in a painting apparatus, and a cleaning module for use with a roller assembly.

It is known for users to decant paint from a paint container into a roller tray, load a roller sleeve or primary roller with paint using the roller tray, and then apply paint to a surface such as a wall or ceiling with the roller sleeve.

Users find this known process both time consuming, in that it is necessary to continually load the roller sleeve with paint from the roller tray and decant paint from the paint container to the roller tray. The risk of spilling paint is also high due to the need to decant paint into the roller tray, and then load the roller sleeve before applying the paint to the surface.

Painting apparatus exists whereby paint is automatically fed from the paint container to the roller sleeve without the need to decant the paint into a roller tray, and load the roller sleeve.

A problem with such apparatus is the requirement to clean the primary roller which by the nature of the complex automated paint feed system can be difficult.

According to the present invention there is provided a painting apparatus comprising a paint module, an applicator assembly having an applicator surface, and a pump, the paint module having a container receiving section, the applicator assembly being fluidly connectable to the container receiving section such that the pump can supply liquid contained in the container receiving section to the applicator assembly, in which the apparatus can operate in a painting cycle where the container receiving section receives a paint container with a supply of paint such that the paint can be supplied to the applicator assembly, and in a cleaning cycle where the container receiving section receives a liquid in the form of a cleaning fluid, such that the cleaning fluid can be supplied to the applicator assembly.

Advantageously, the paint module enables either paint or cleaning fluid to be supplied to the applicator according to the mode selected, and therefore the applicator can be cleaned without removing it from the module.

According to another aspect of the present invention there is provided a cleaning module for a roller assembly comprising a well which can receive a primary roller of the roller assembly, in which the cleaning module includes means to rotate the primary roller during the cleaning cycle.

Advantageously the rotation of the primary roller exposes all of the exterior surface of the primary roller to cleaning fluid which is fed to the primary roller.

Preferably the cleaning module includes a cleaning module lid, which in the closed position envelops the primary roller in combination with the well such that cleaning fluid supplied to the primary roller is retained in close proximity to the primary roller.

Advantageously, this allows the roller assembly to be cleaned in a contained cleaning module.

According to another aspect of the present invention there is provided a method of cleaning a roller assembly having a primary roller including the steps of providing a secondary roller which is biased against an exterior surface of the primary roller, providing a supply of cleaning fluid to the exterior surface, and rotating the primary roller.

The secondary roller acts like a mangle against the primary roller as the primary roller is rotated, and therefore squeezes paint from the primary roller to assist in the removal of paint.

Figure 1A:
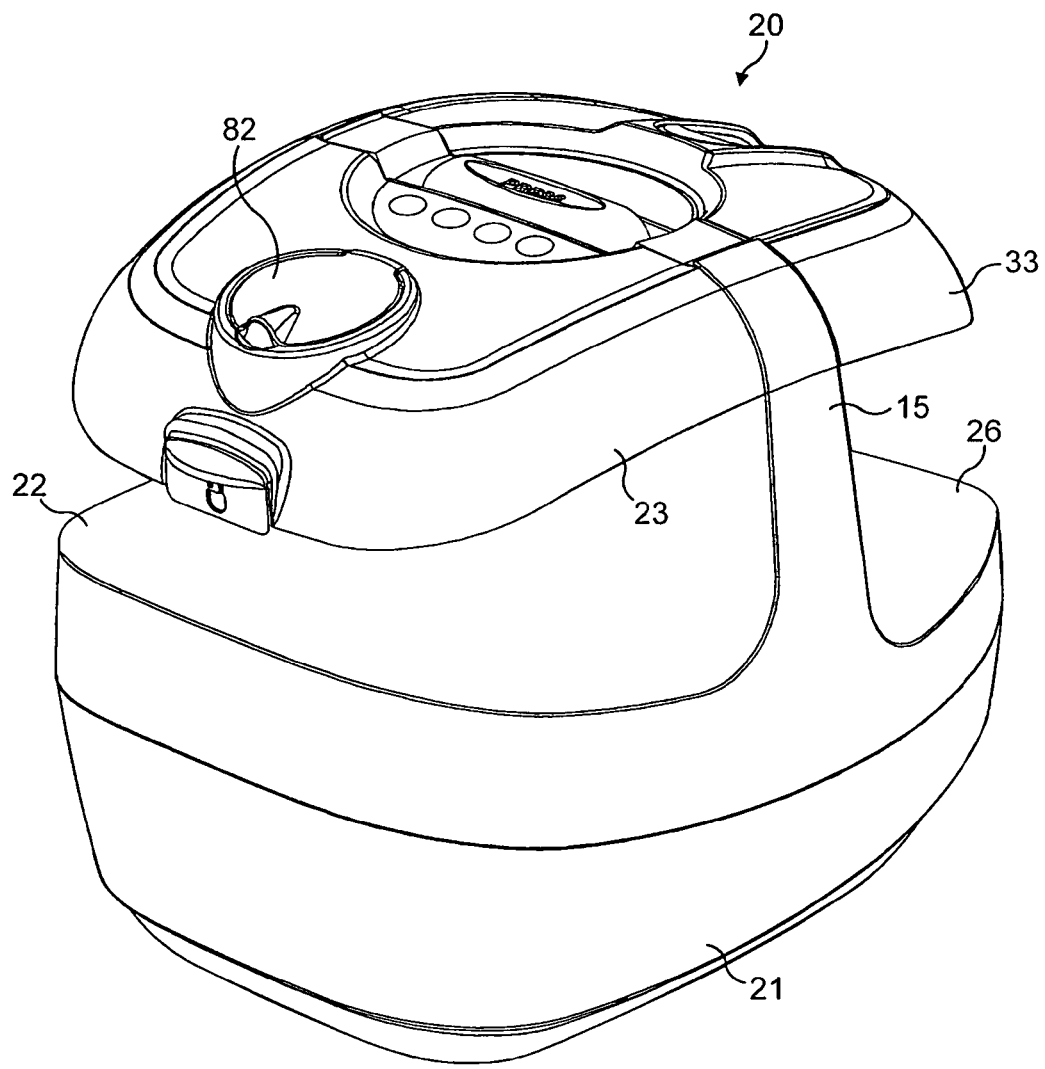
Figure 2:
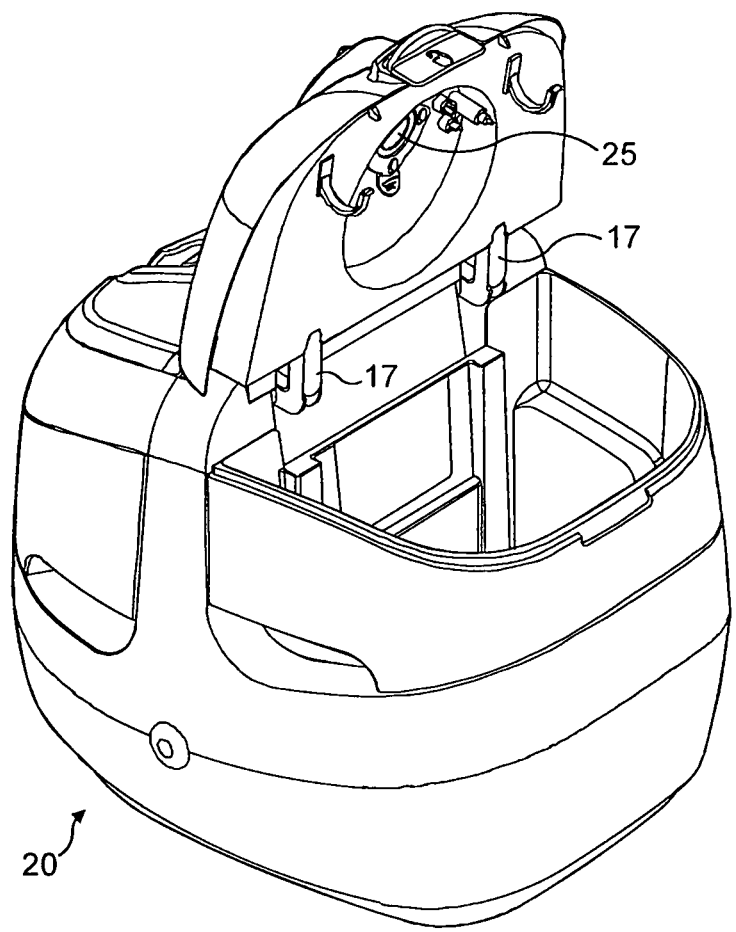
Figure 3:
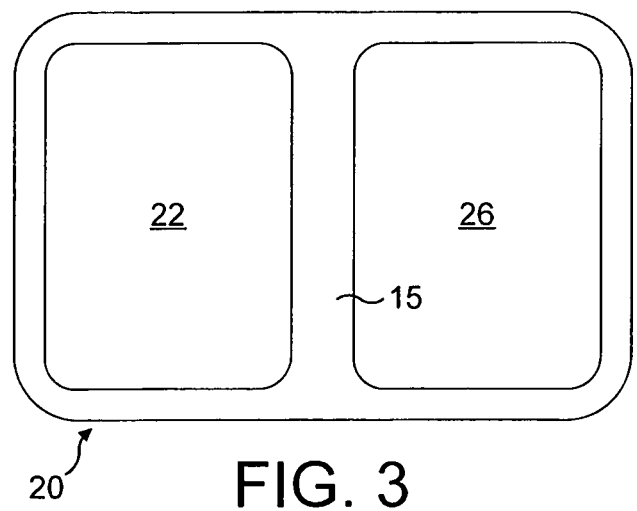
Figure 4:
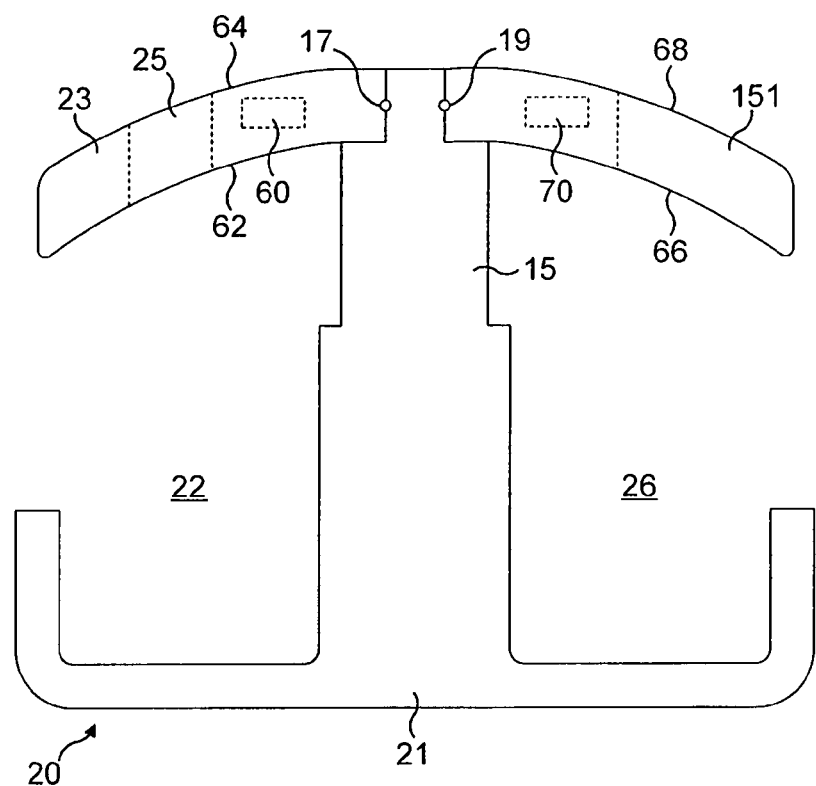
Figure 4A:
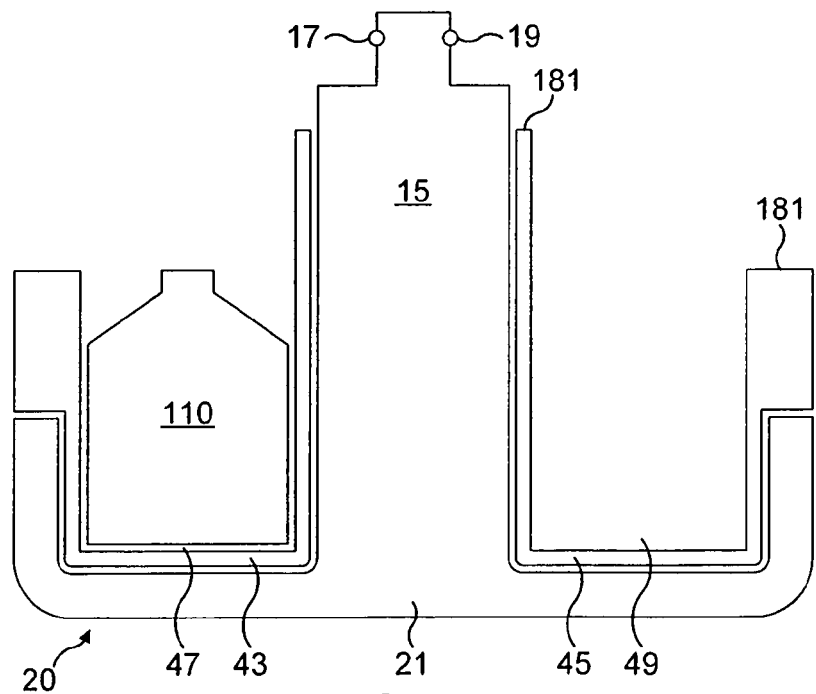
Figure 5:
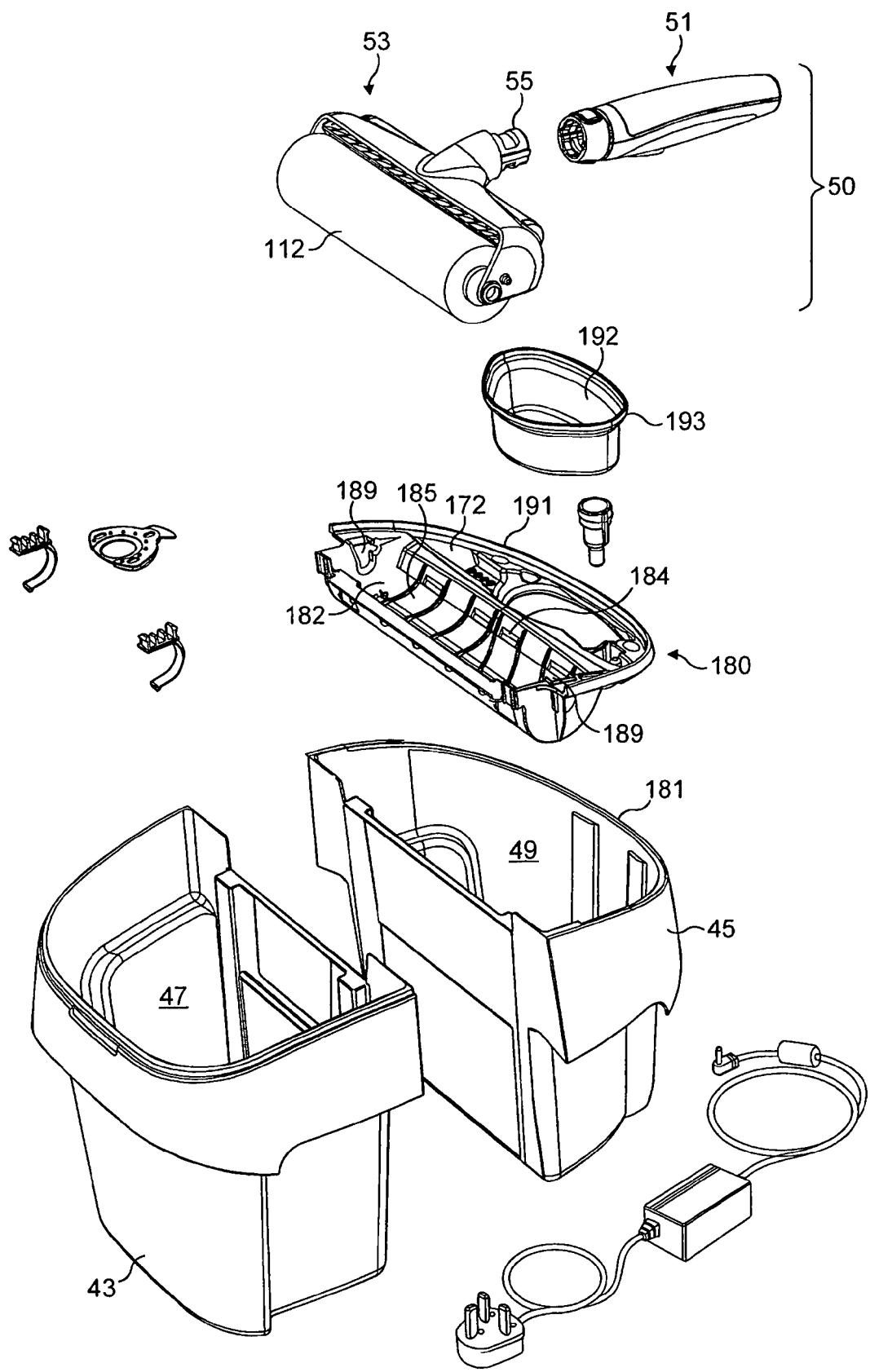
Figure 6:
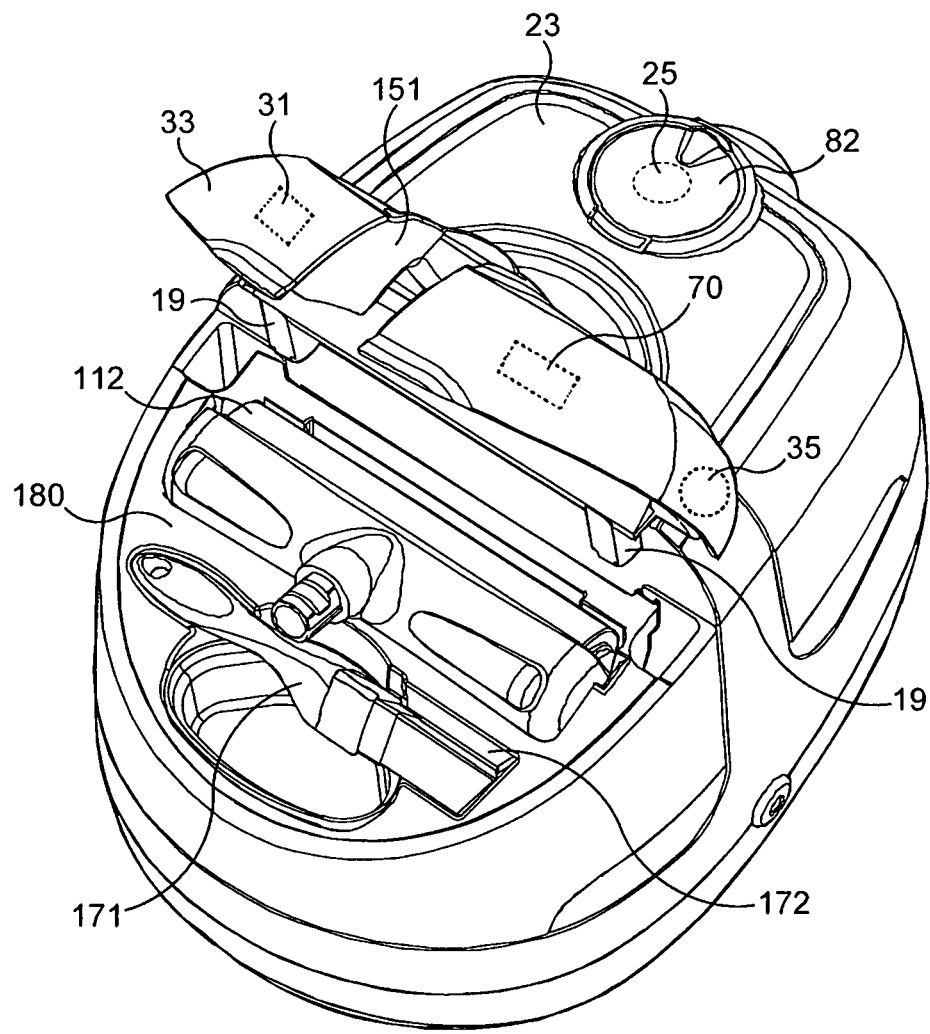
Figure 7:
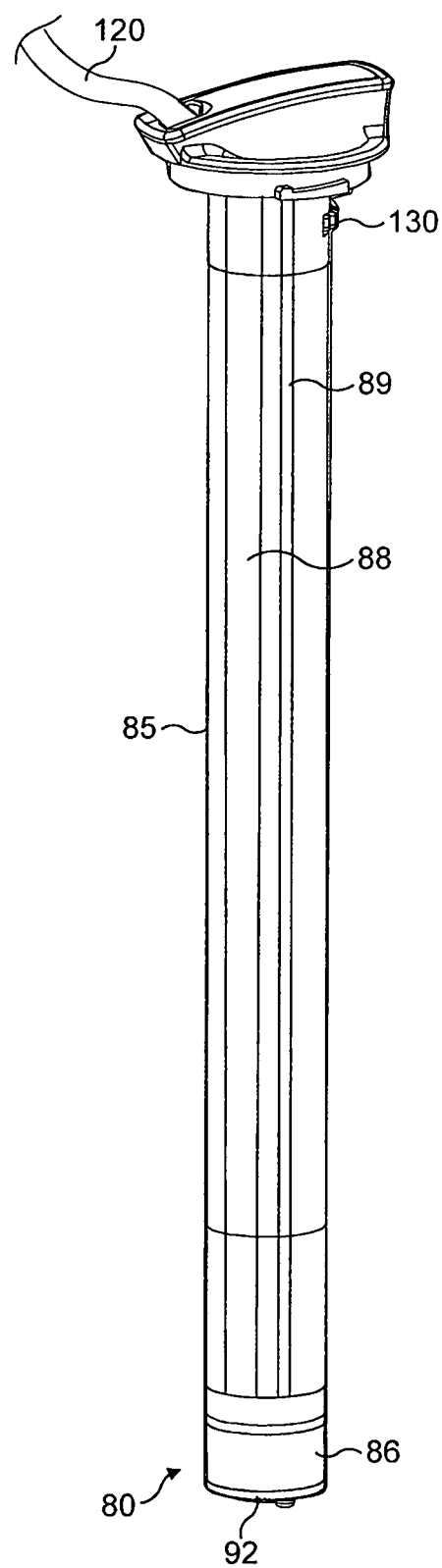
Figure 7A:
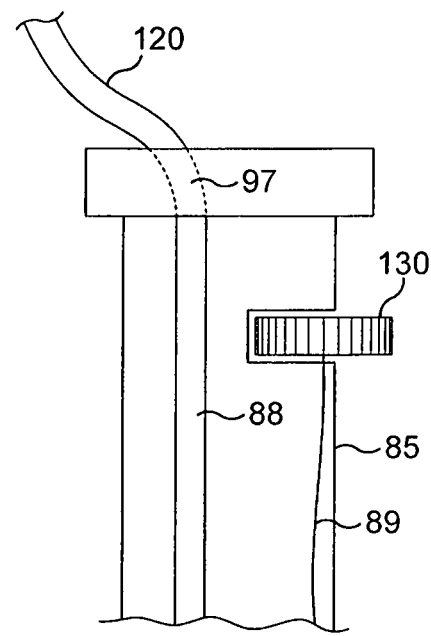
Figure 7B:
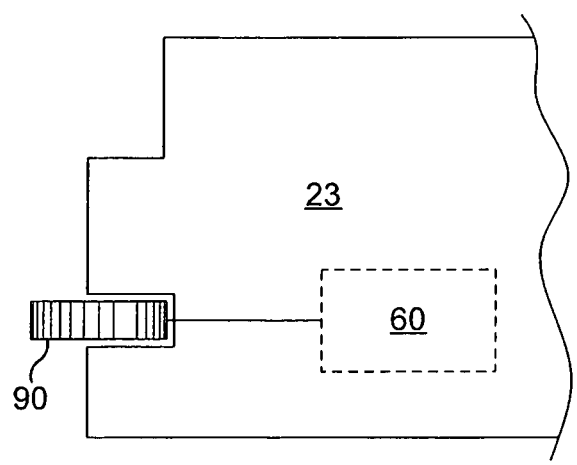
Figure 10:
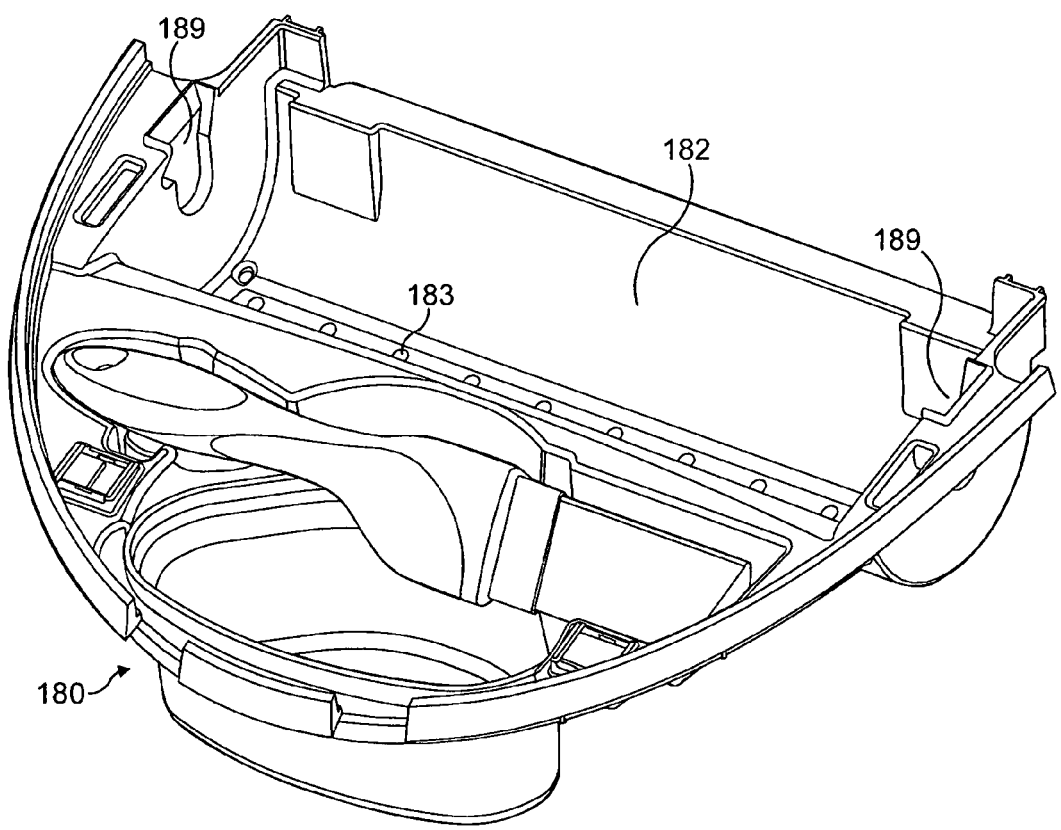
Figure 11:
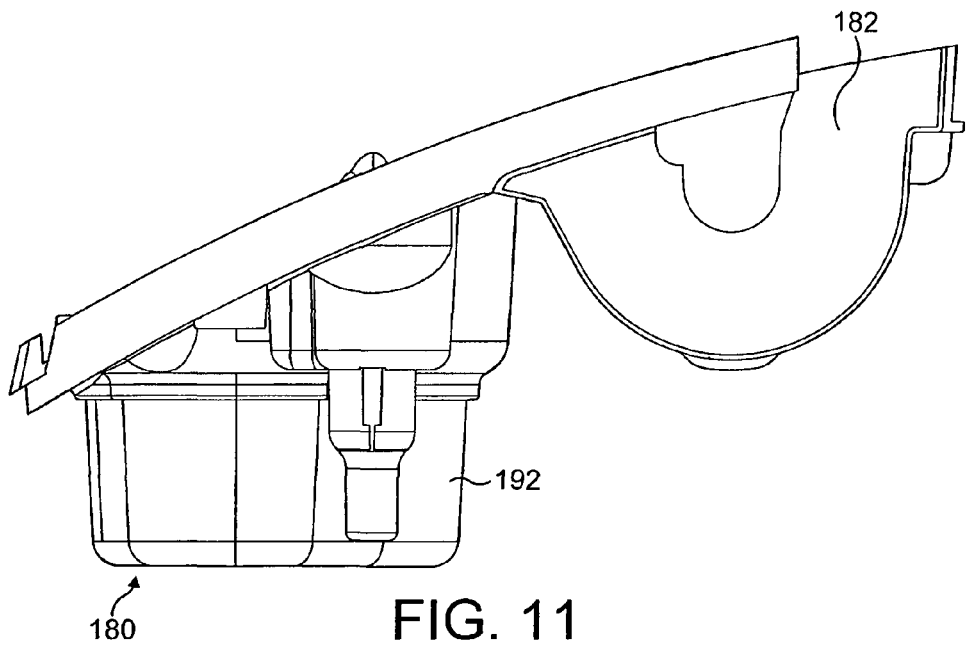
Figure 12:
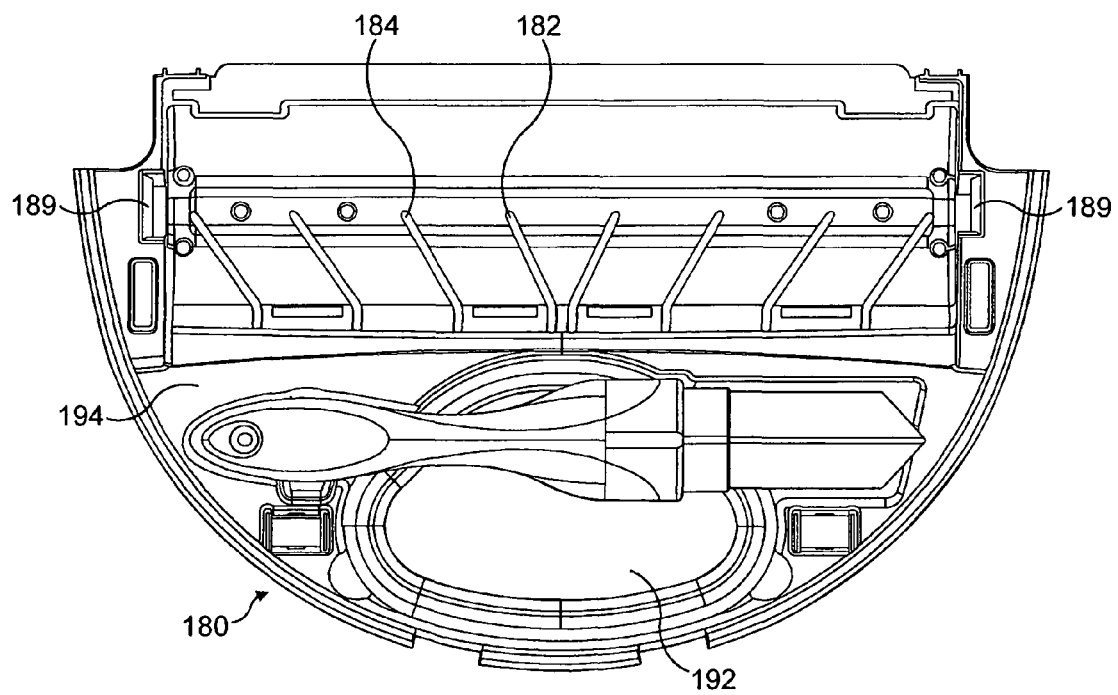
Figure 13:
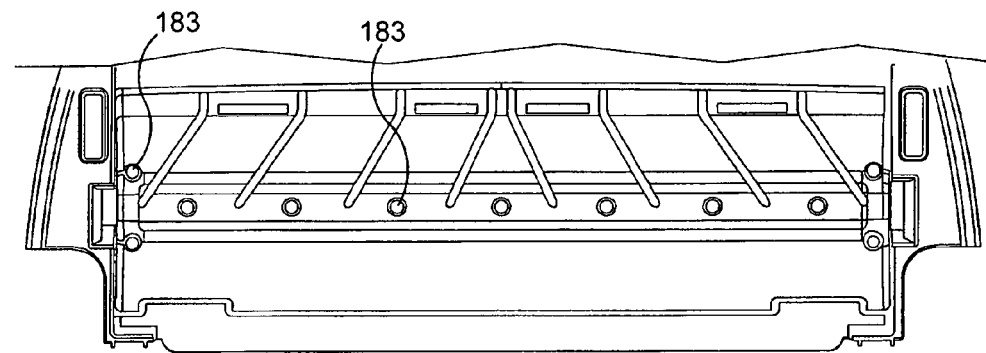
Figure 14:
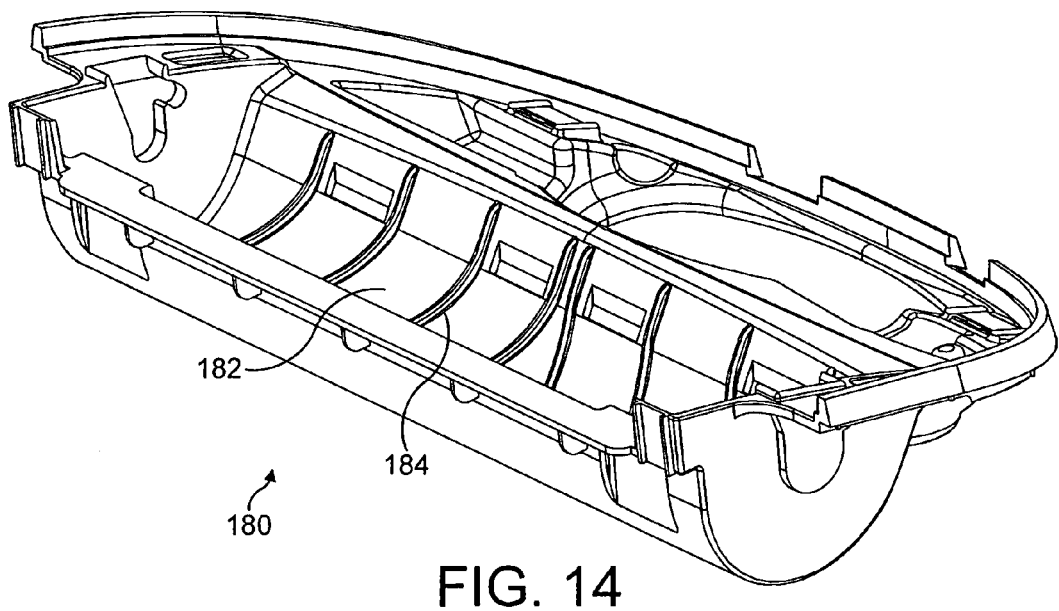
Figure 15:
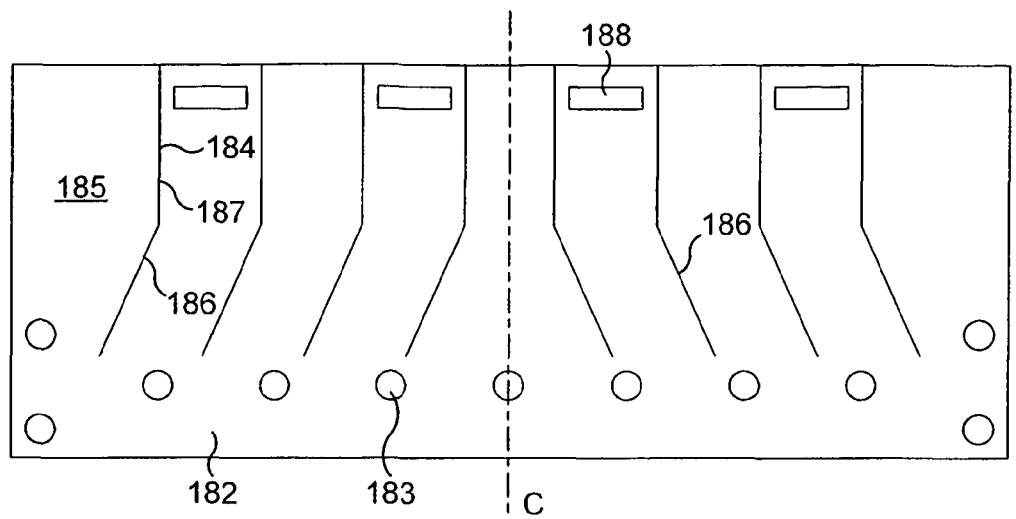
Figure 16:
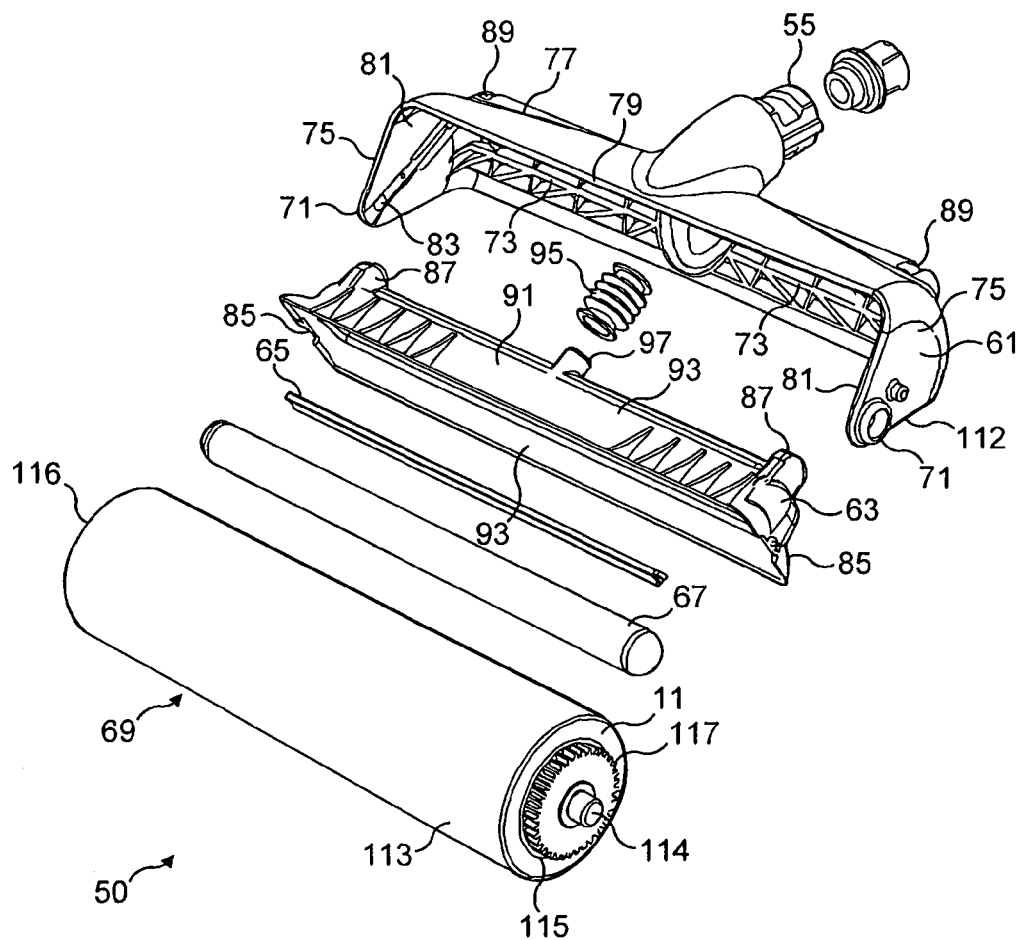
Figure 17:
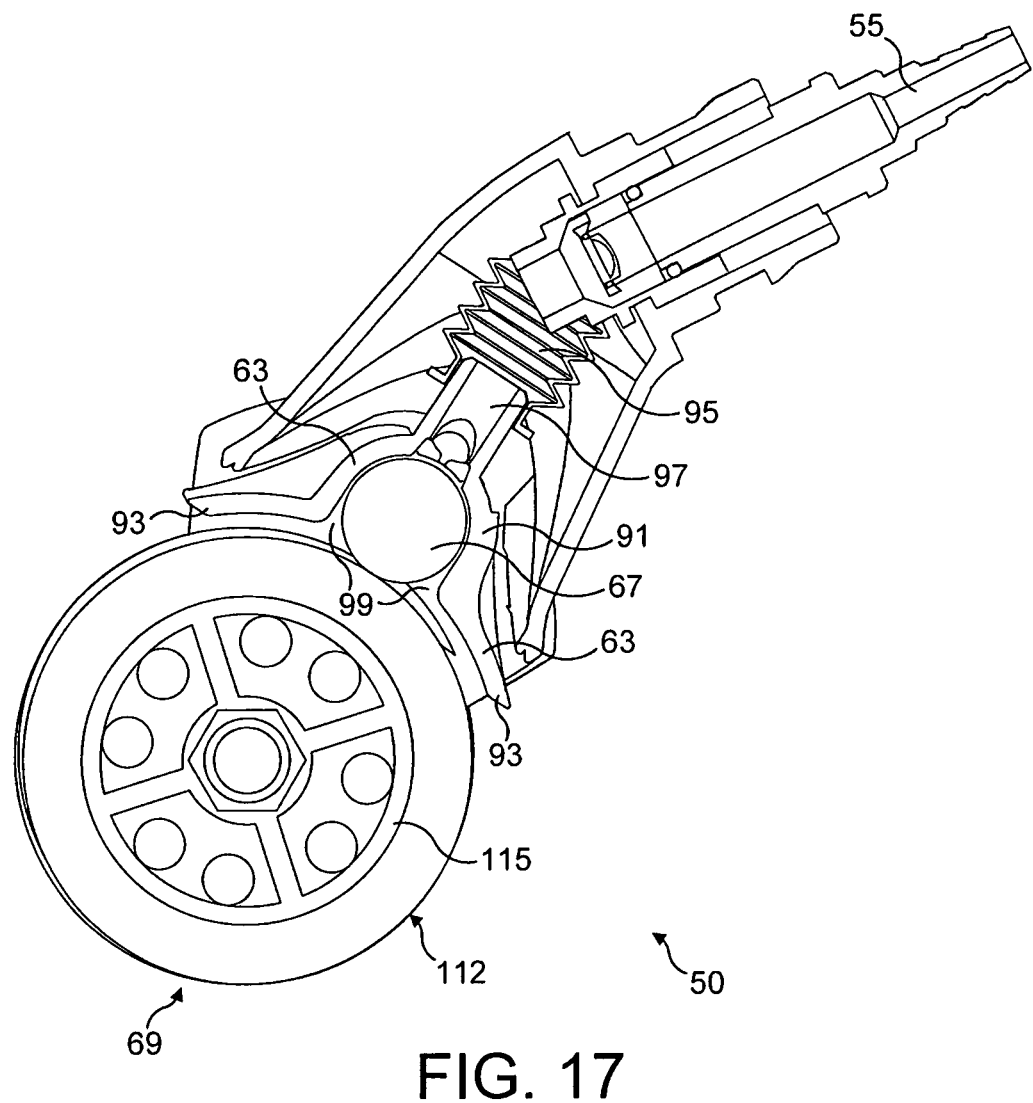
Figure 18:
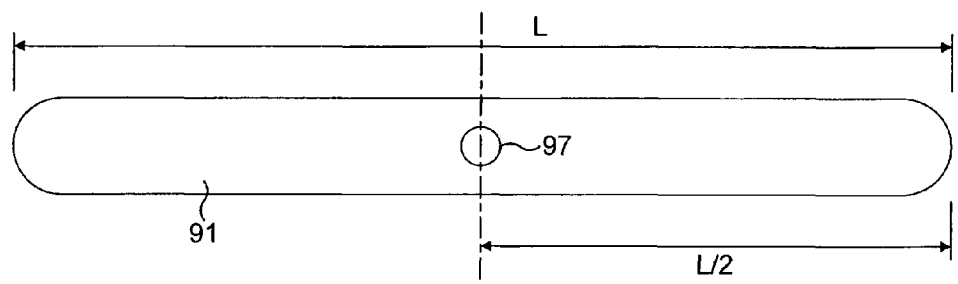
Figure 19:
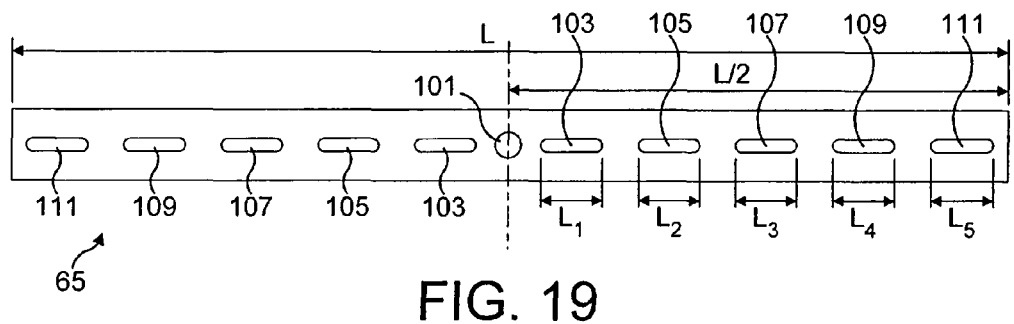
Figure 20:
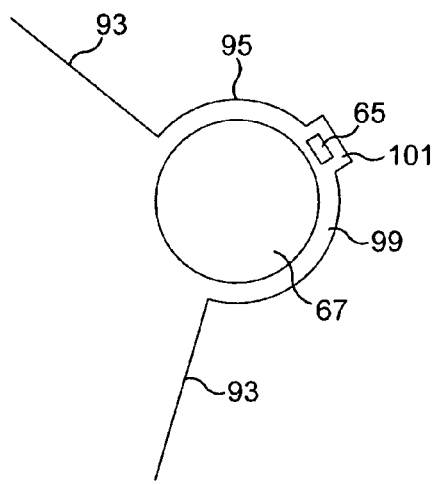
Figure 21:
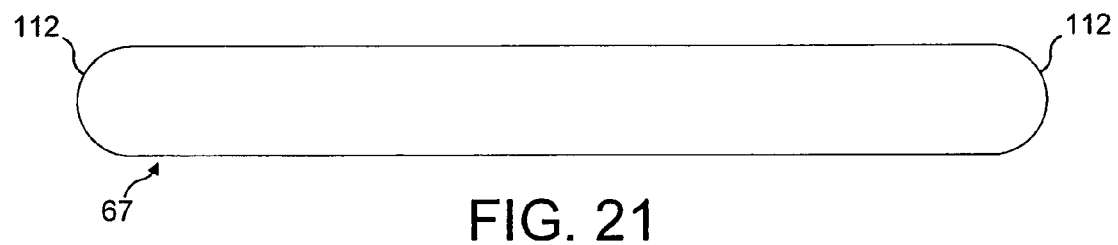
Figure 22:
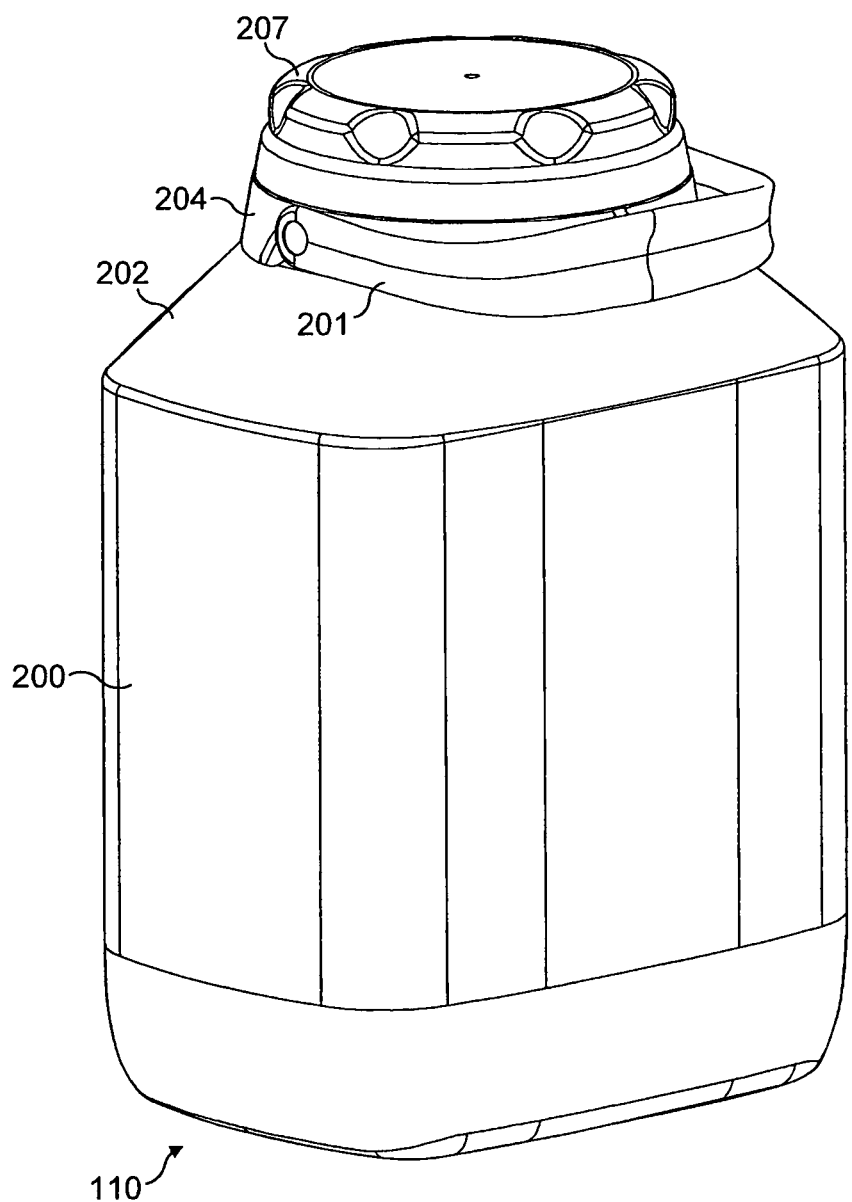
Figure 23:
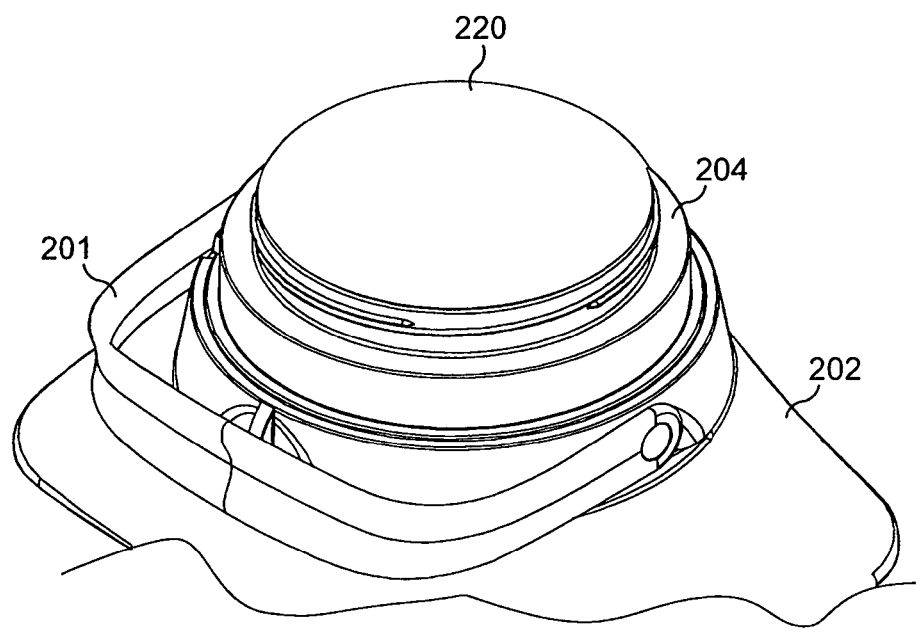
Figure 28A:
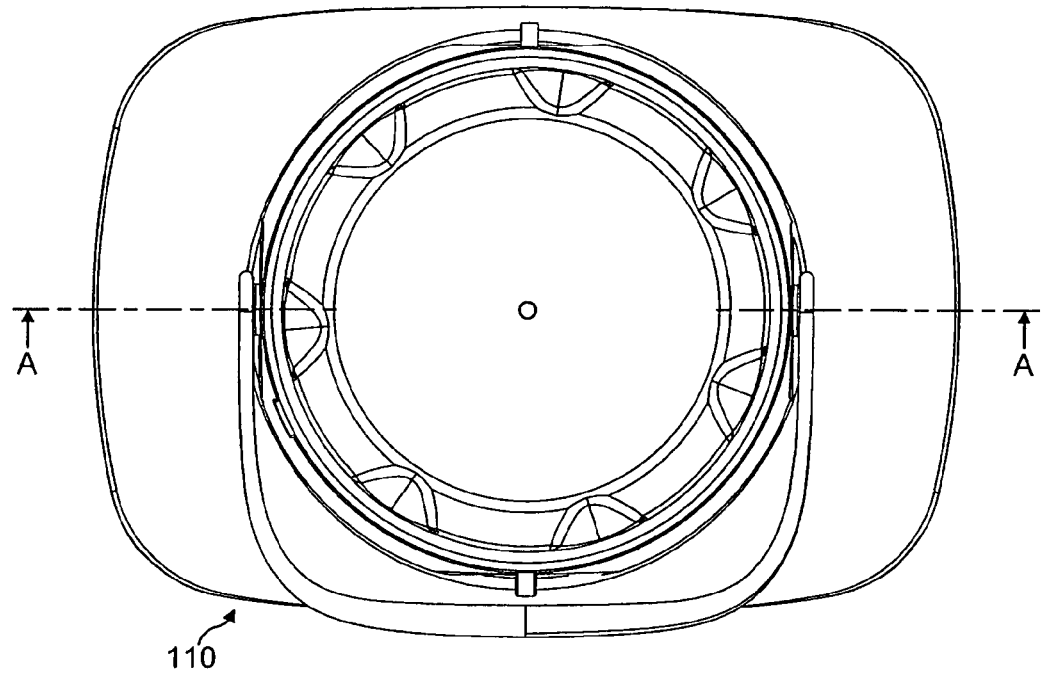
Figure 28B:
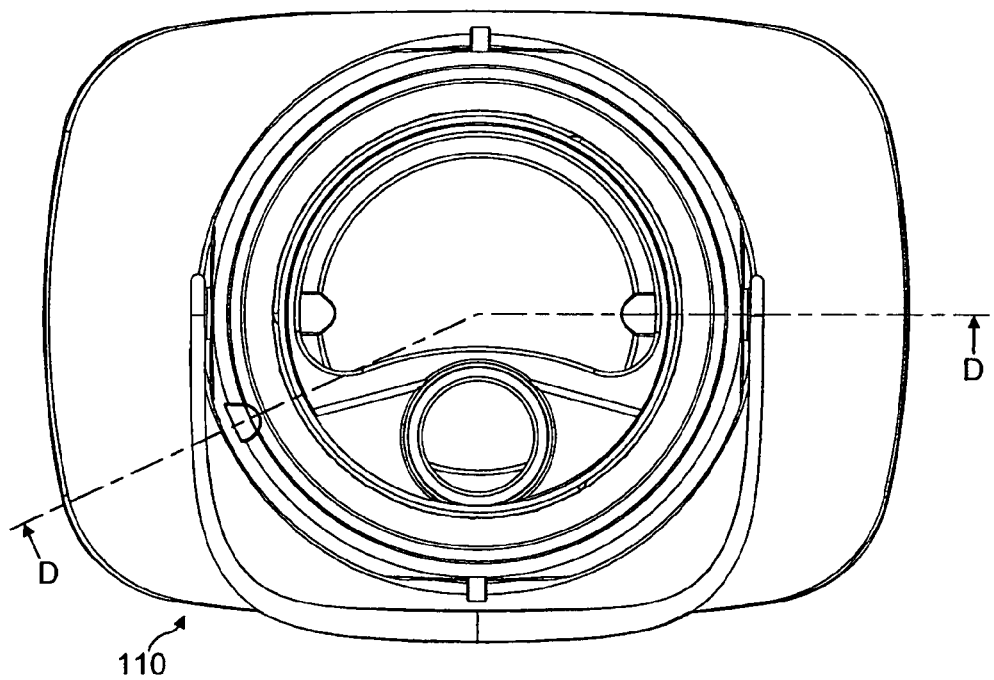
Figure 29:
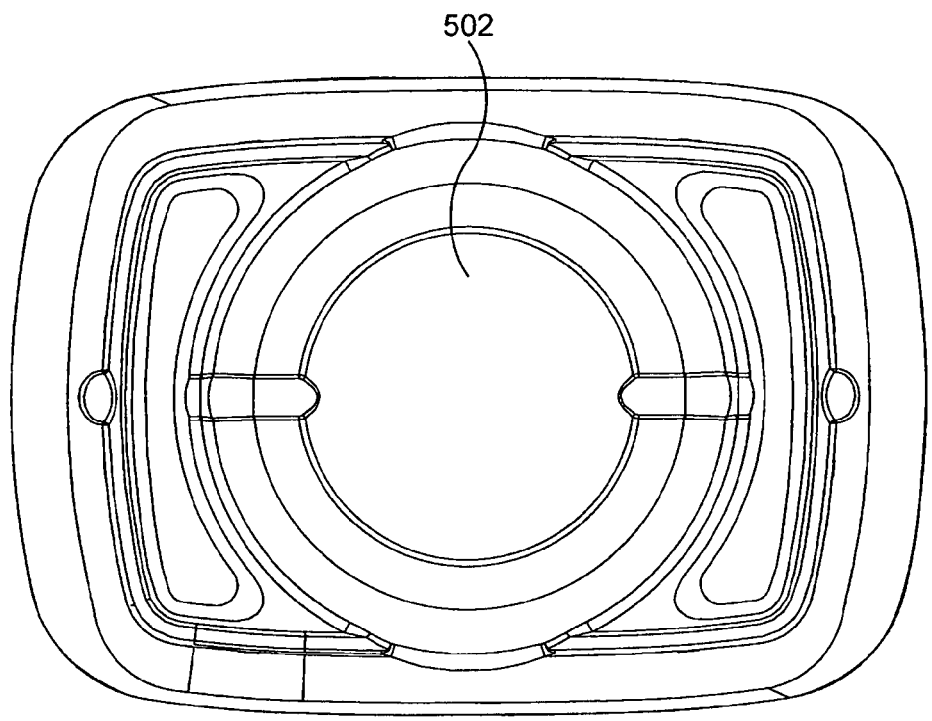
Figure 29A:
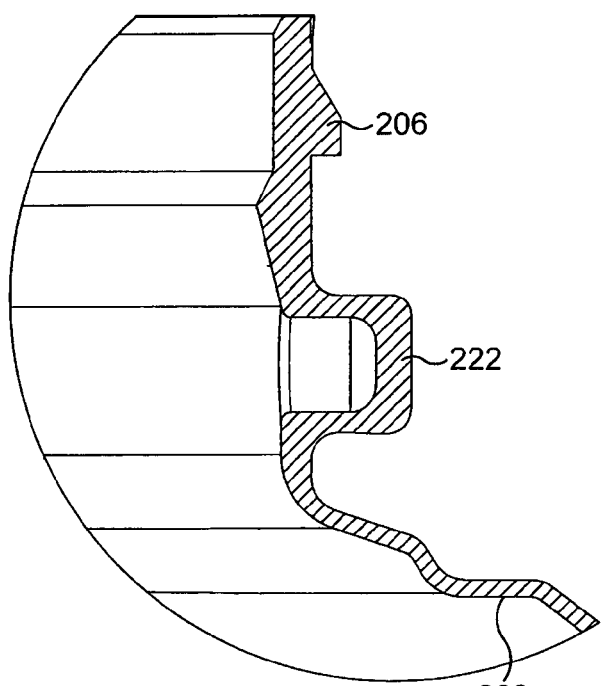
Figure 30:
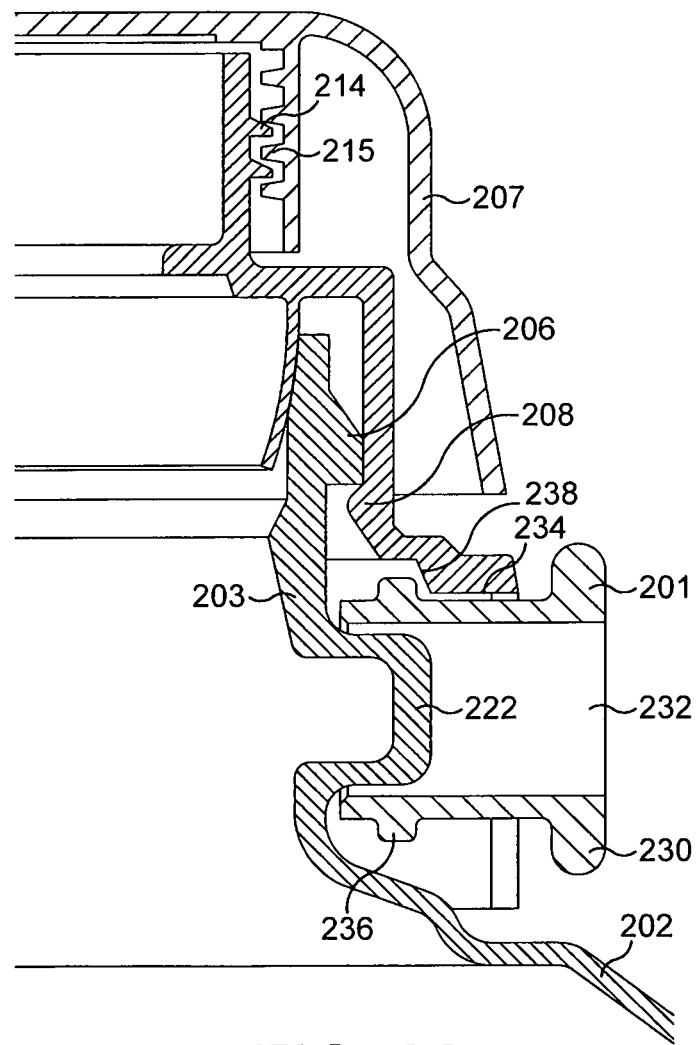
Figure 31:
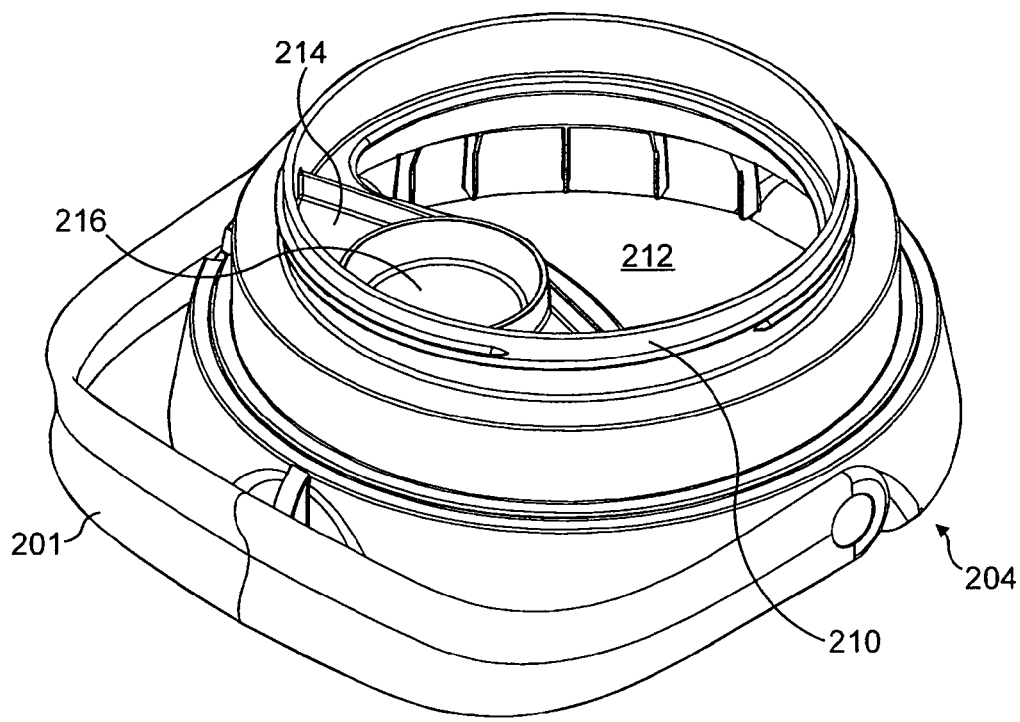
Figure 32:
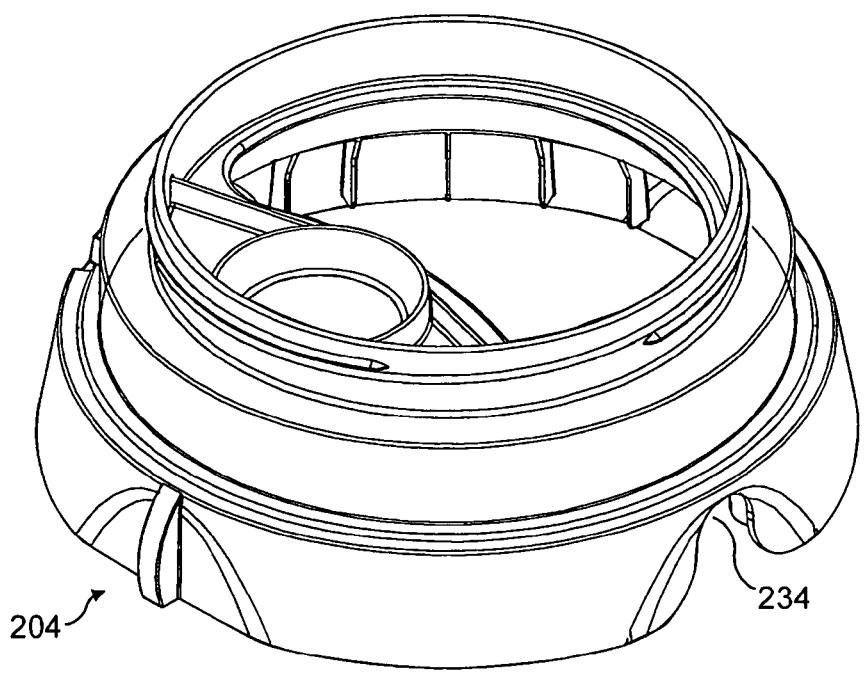
Figure 33:
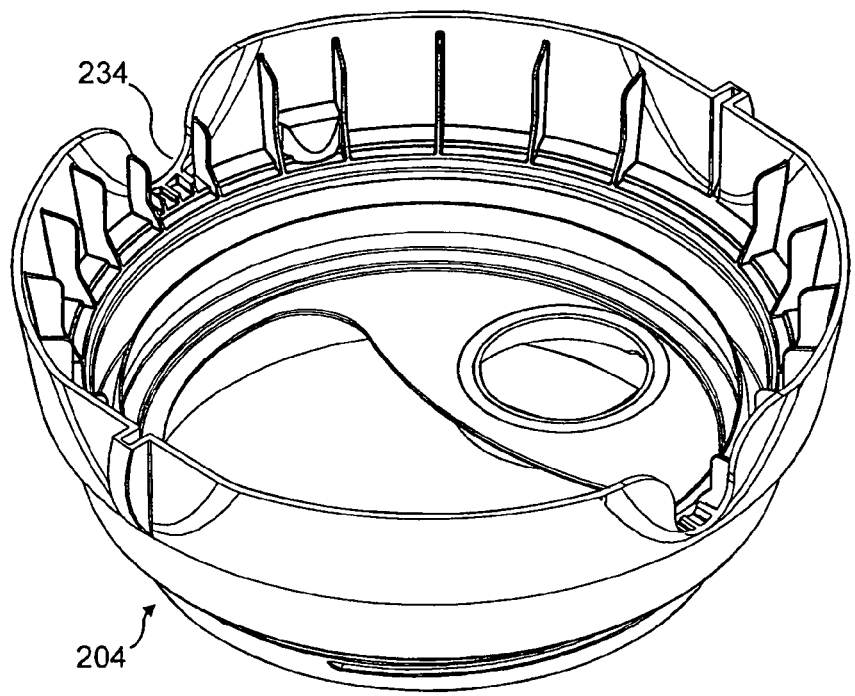
Figure 34:
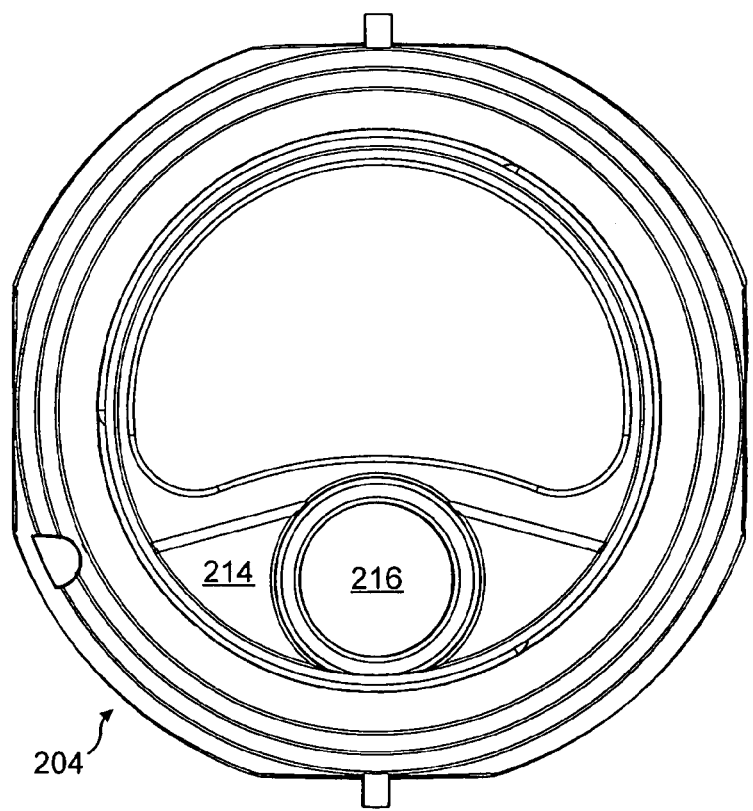
Figure 35:
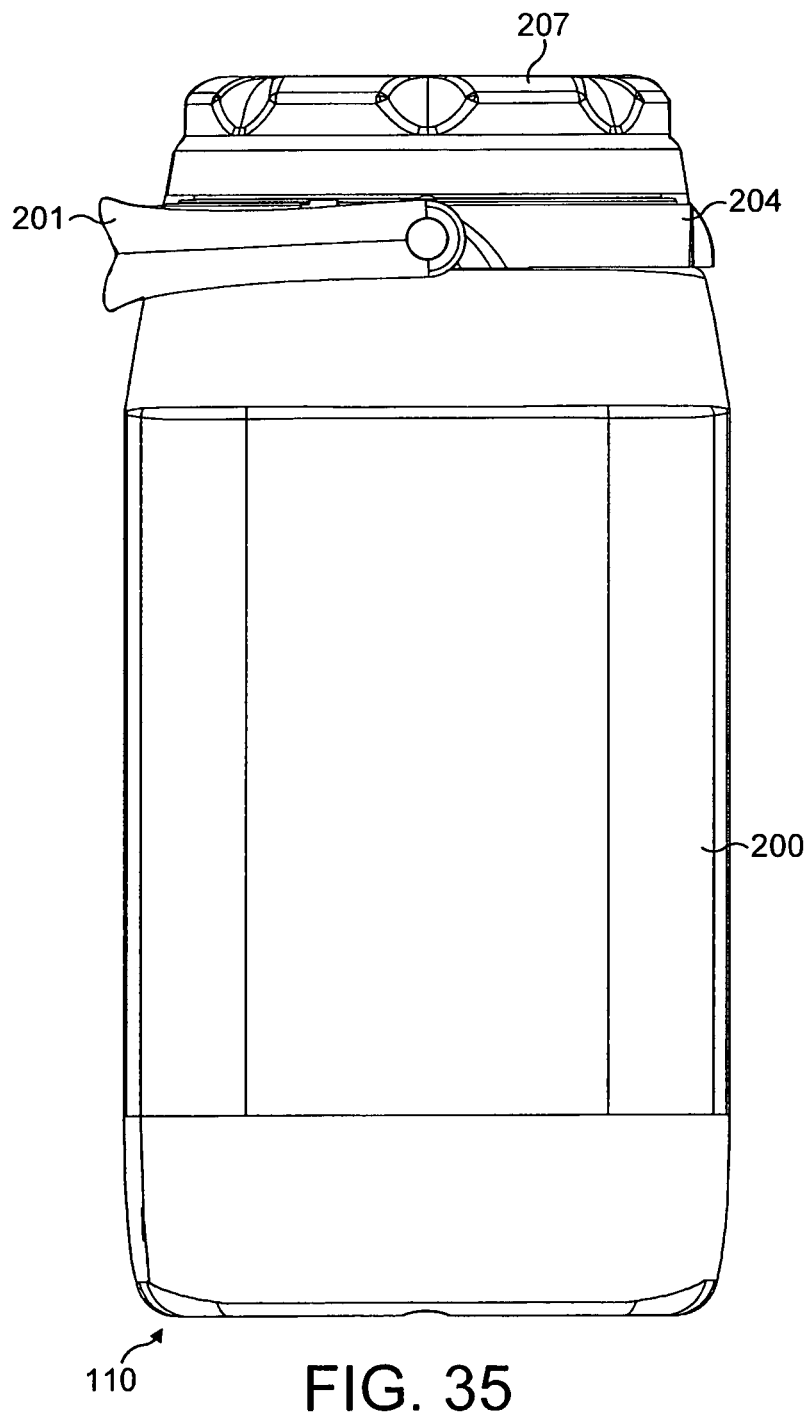
Figure 36:
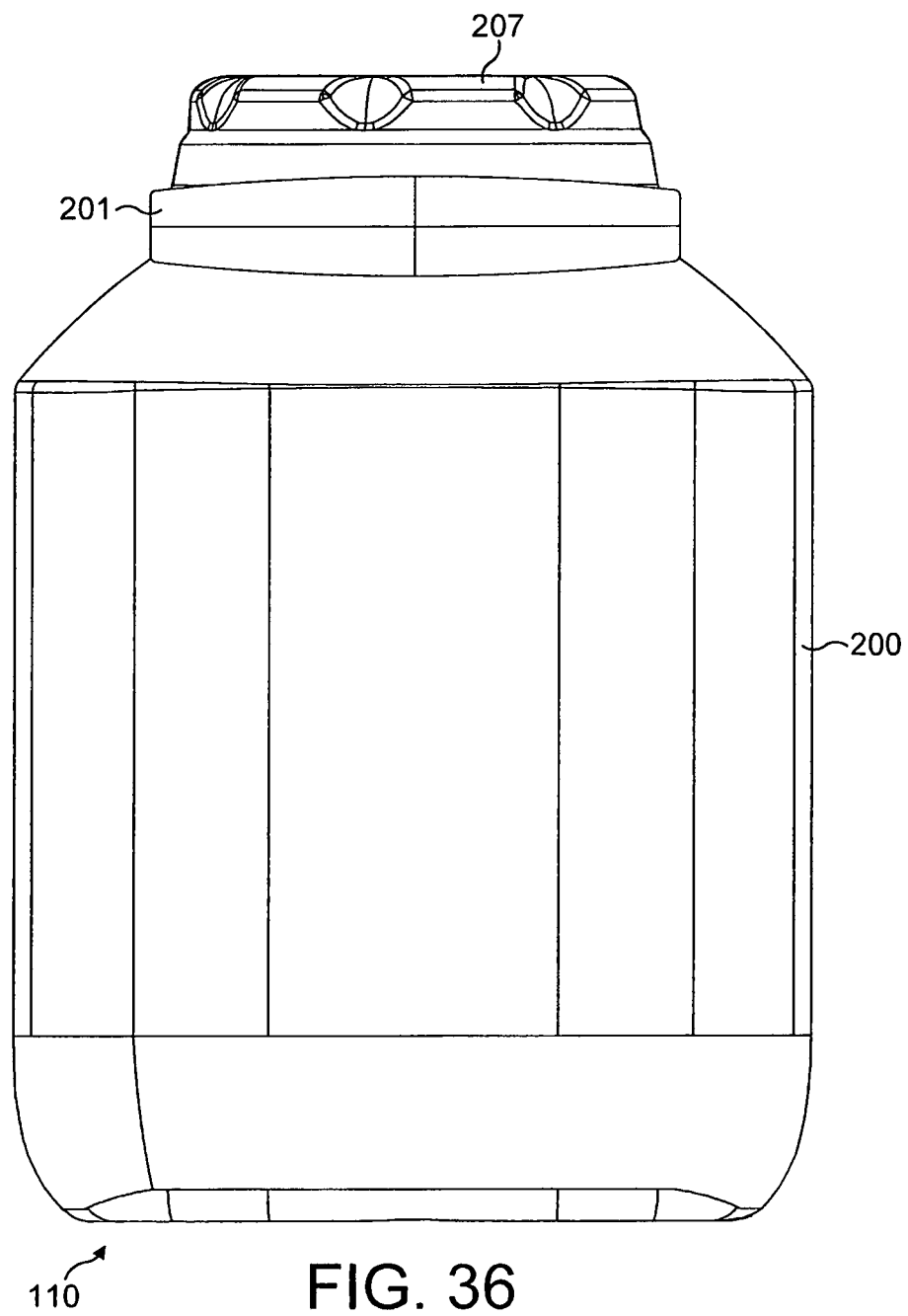
Figure 36A:
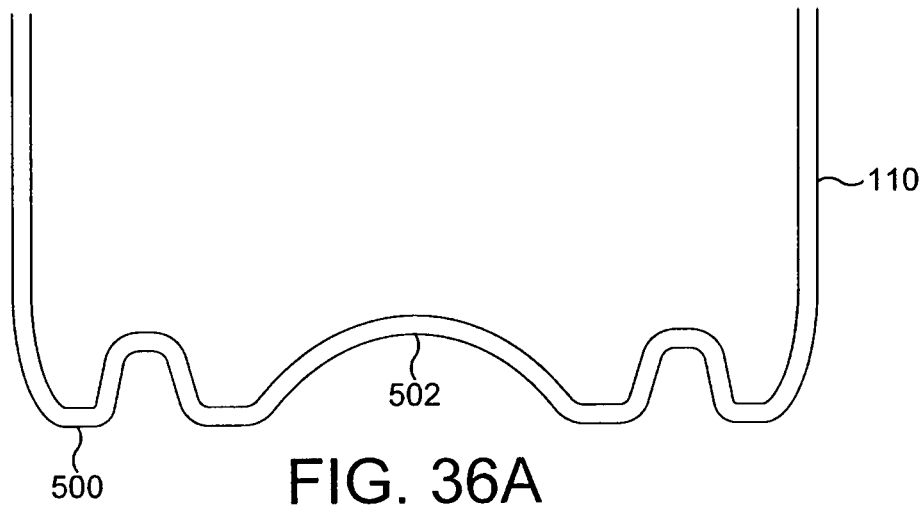
Figure 37:
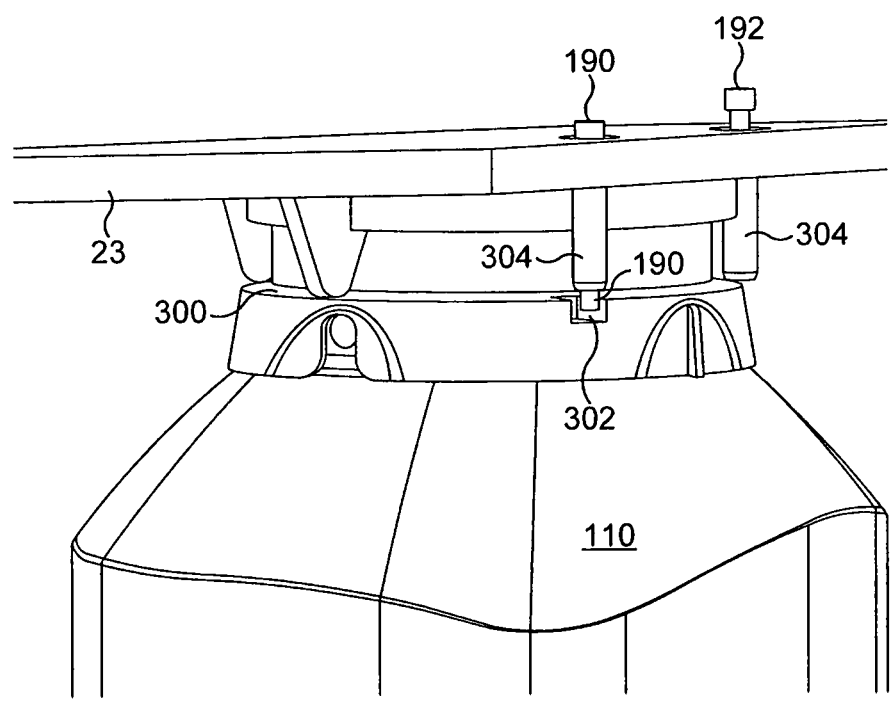
Figure 38:
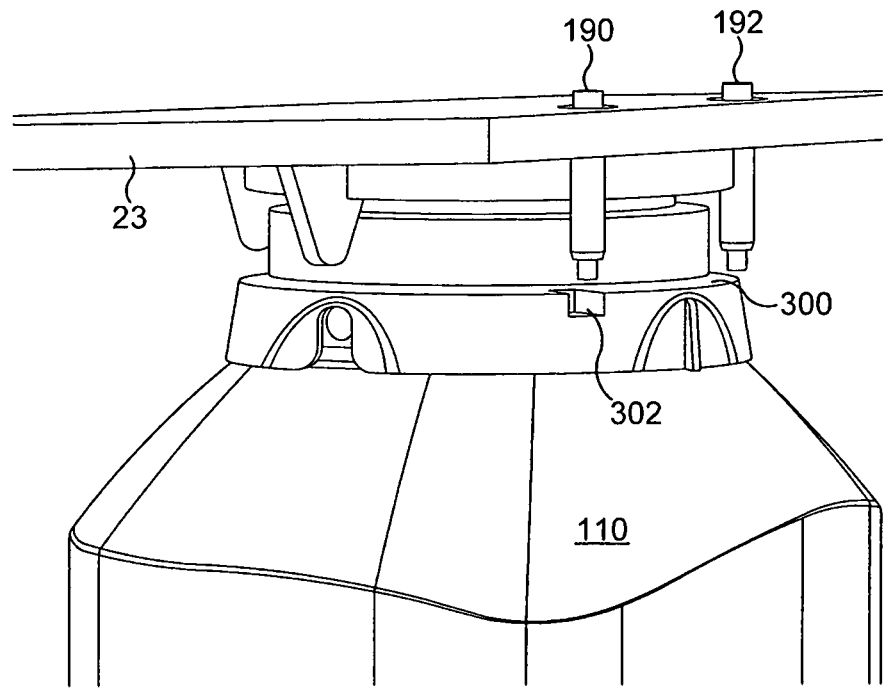
Figure 39:
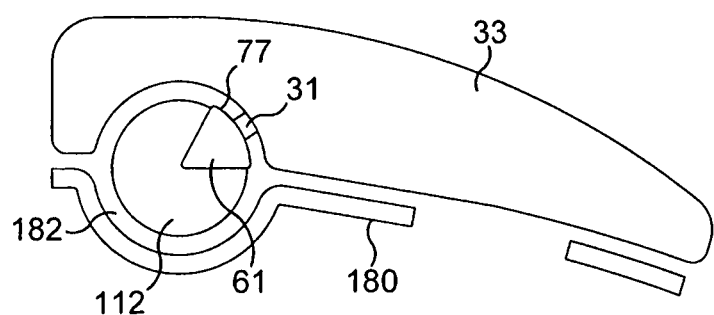
Figure 40:
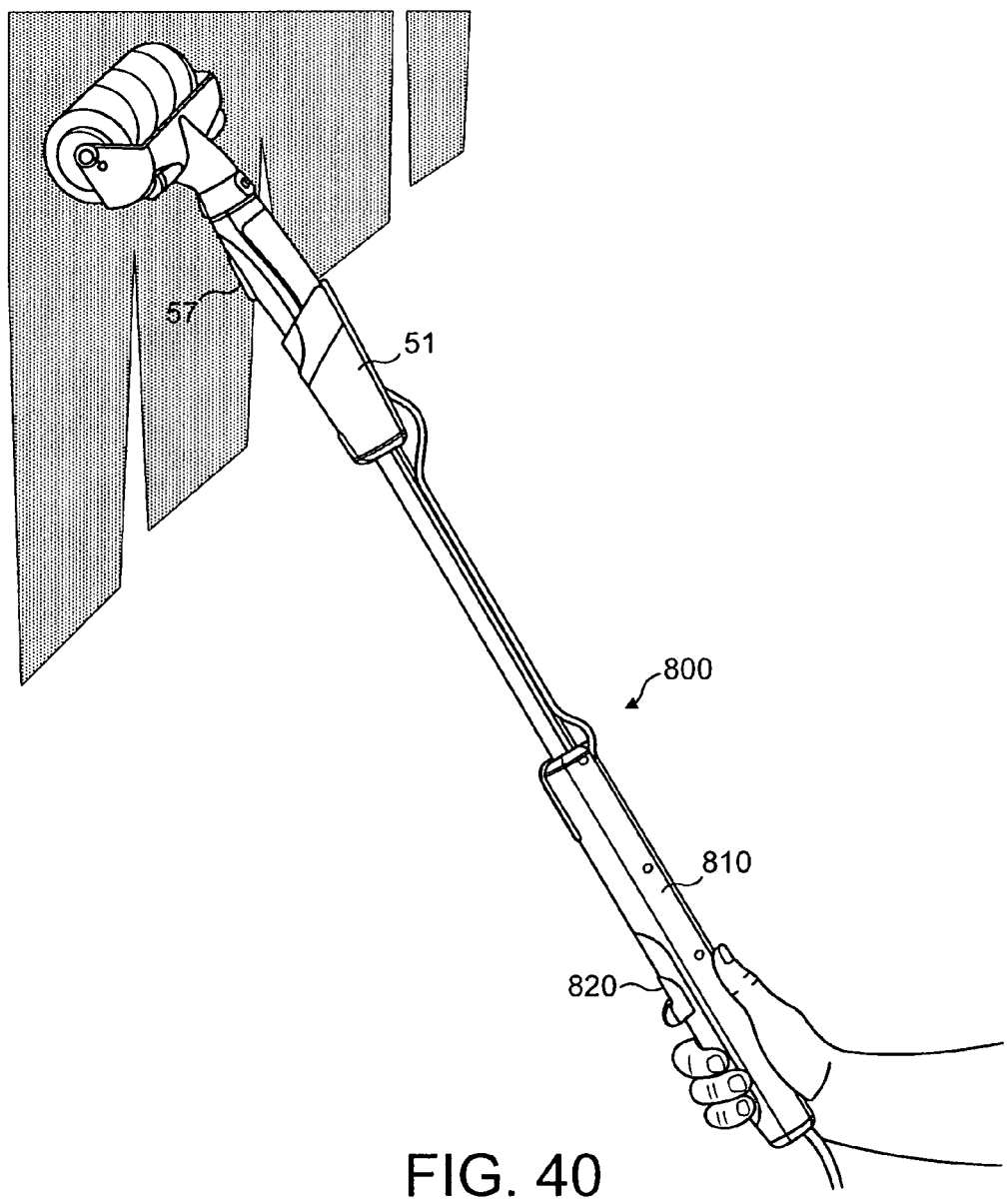
Figure 41:
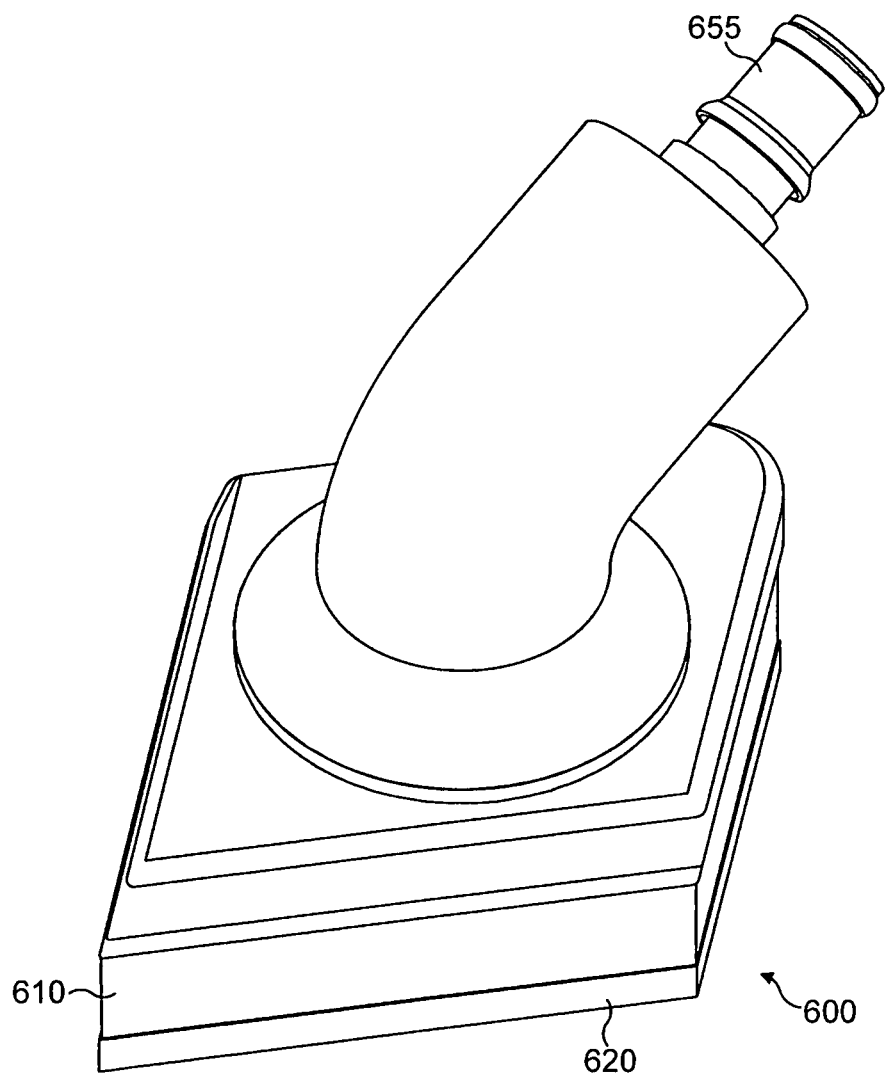
Figure 42:
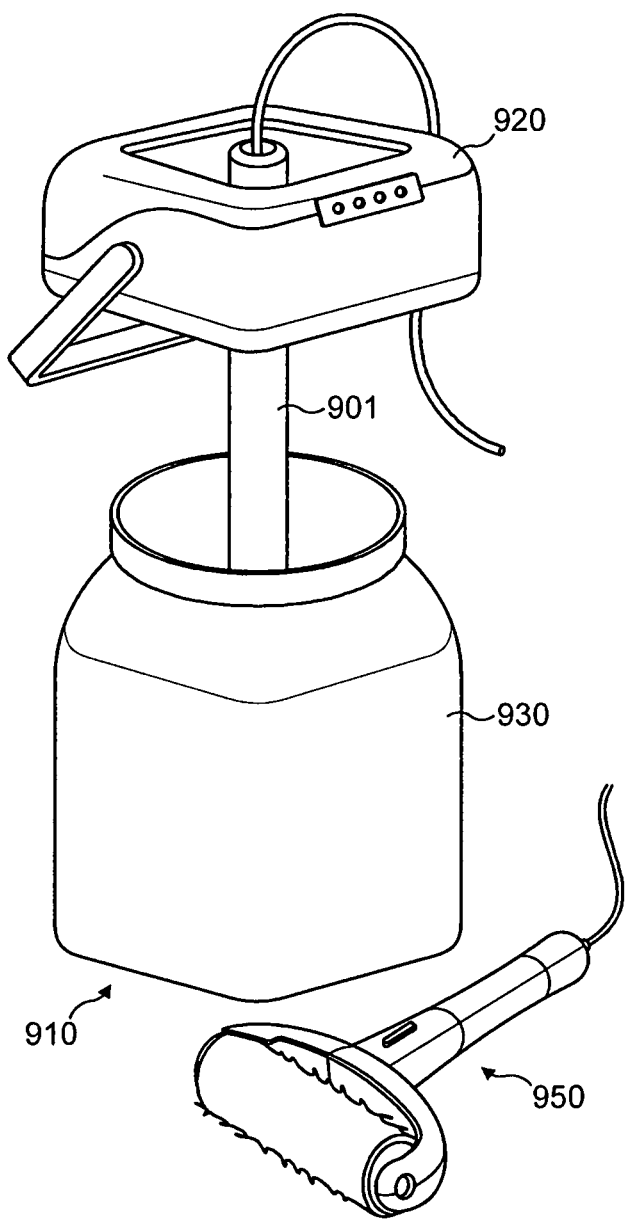
Figure 43:
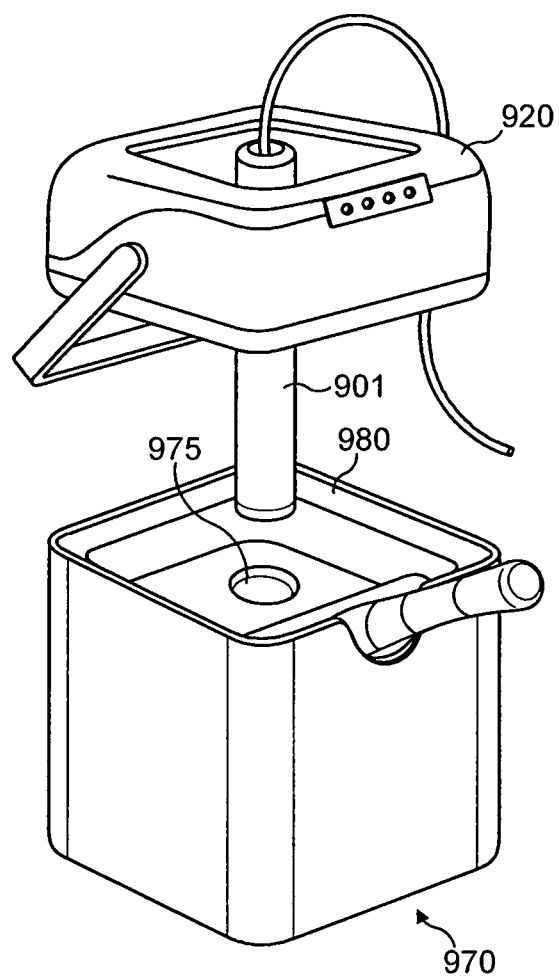
Figure 44A:
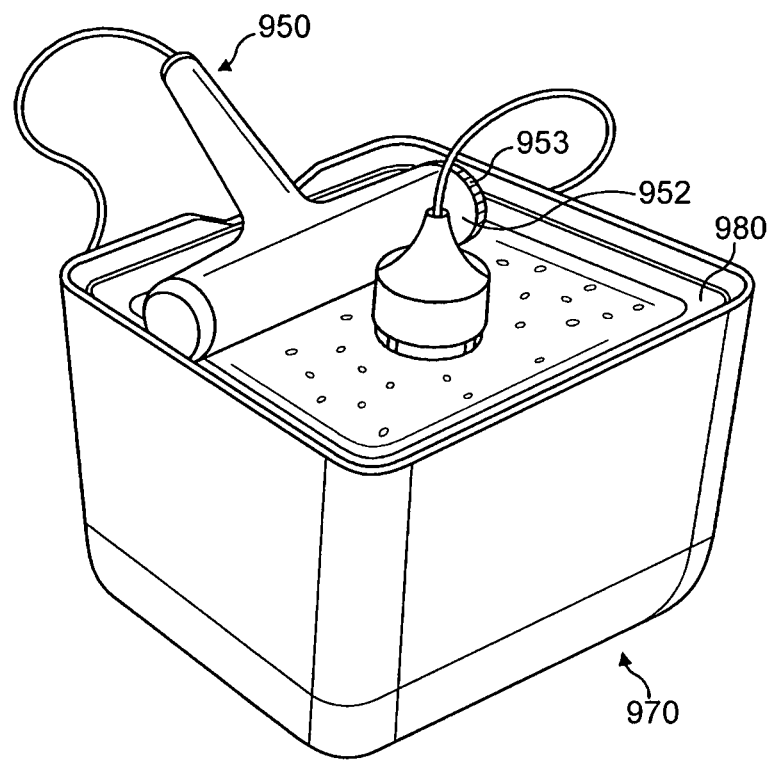
Figure 44B:
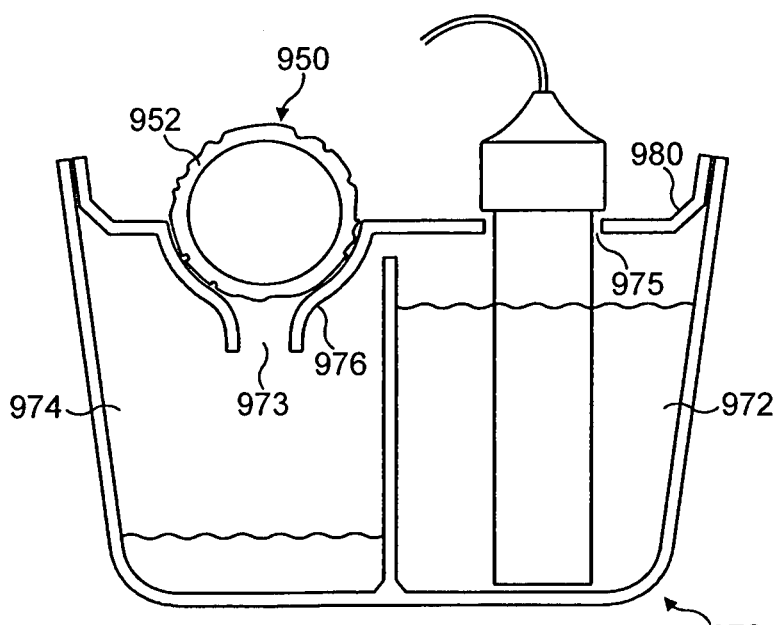
Figure 45:
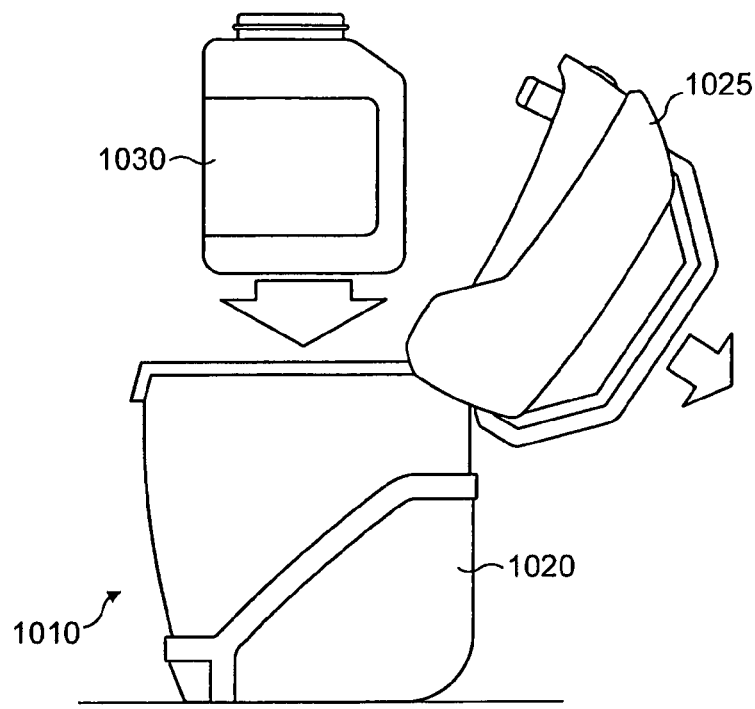
Figure 46:
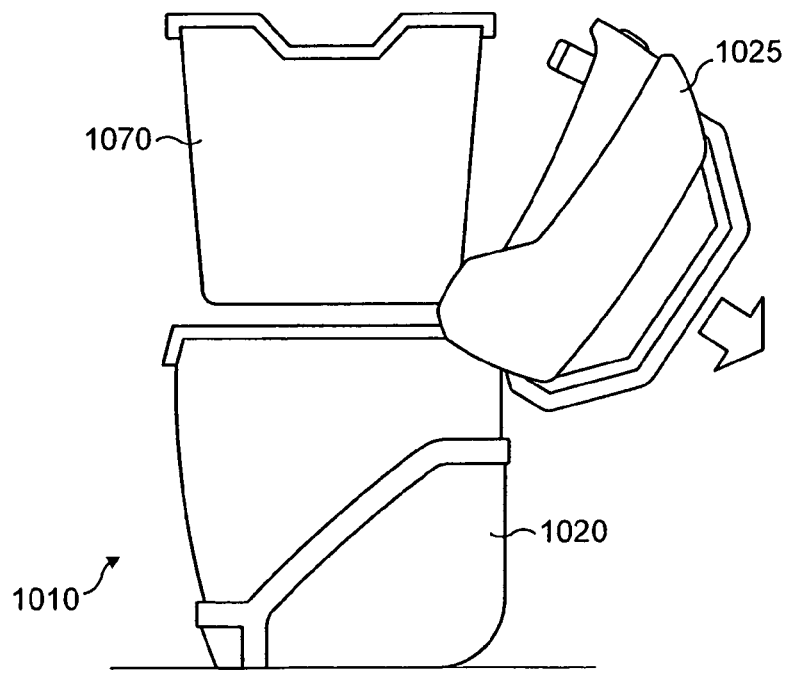
Figure 47:
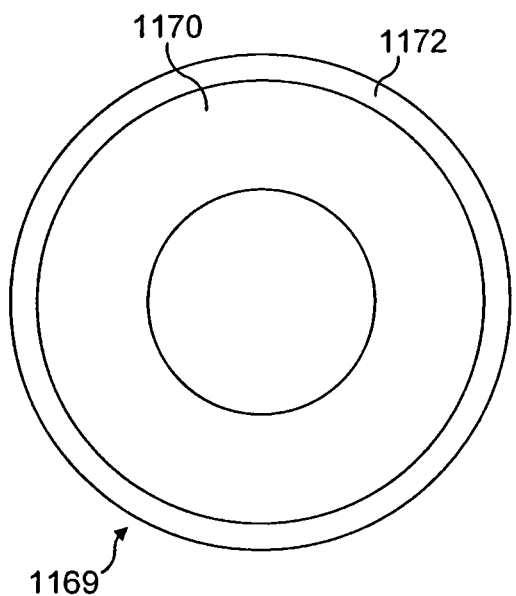

The invention will now be described by way of example only, with reference to the accompany drawings, in which:

FIG. 1 is a perspective view of a painting apparatus according to the present invention, FIG. 1A is a perspective view of part of the painting apparatus of FIG. 1, FIG. 2 is a perspective view of part of the painting apparatus of FIG. 1, FIG. 3 is a plan view of part of the painting apparatus of FIG. 1, FIGS. 4 and 4A are side views of part of the painting apparatus of FIG. 1, FIG. 5 is an exploded perspective view of the painting apparatus of FIG. 1, FIG. 6 is a perspective view of part of the painting apparatus of FIG. 1, FIG. 7 is a perspective view showing part of the painting apparatus of FIG. 1, FIGS. 7A, 7B, and 8 are front view showing part of the painting apparatus of FIG. 1, FIGS. 9 to 11 are perspective views showing part of the painting apparatus of FIG. 1, FIGS. 12 and 13 are plan views showing part of the painting apparatus of FIG. 1, FIG. 14 is a perspective view showing part of the painting apparatus of FIG. 1, FIG. 15 is a plan view showing part of the painting apparatus of FIG. 1, FIG. 16 is an exploded view of part of the painting apparatus of FIG. 1, FIG. 17 is a side section view showing part of the painting apparatus of FIG. 1, FIG. 18 is a plan view showing part of the painting apparatus of FIG. 1, FIG. 19 is a plan view showing part of the painting apparatus of FIG. 1, FIG. 20 is a side view showing part of the painting apparatus of FIG. 1, FIG. 21 is a plan view showing part of the painting apparatus of FIG. 1, FIG. 22 is a plan view showing a paint container for use in the painting apparatus of FIG. 1, FIGS. 23 to 27 are perspective views showing part of the paint container of FIG. 22, FIG. 28A is a plan view of the paint container of FIG. 22 with the closure secured, FIG. 28B is a plan view of the paint container of FIG. 22 with the closure removed, FIG. 29 is a below plan view of the paint container of FIG. 22, FIG. 29A is a sectional side view of part of the paint container of FIG. 22, FIG. 30 is a sectional side view of part of the paint container of FIG. 22, FIGS. 31 to 34 are perspective views showing part of the paint container of FIG. 22, FIG. 35 is a side view of the paint container of FIG. 22, FIG. 36 is a front view of the paint container of FIG. 22, FIG. 36A is a section front view showing part of the paint container of FIG. 22, FIGS. 37 and 38 are perspective views showing part of the painting apparatus of FIG. 1, FIG. 39 is a side view showing part of the painting apparatus of FIG. 1, FIG. 40 is a perspective view of a an alternative painting apparatus, FIG. 41 is a perspective view of a paint pad according to another aspect of the present invention, FIG. 42 is a perspective view of an alternative painting apparatus, FIGS. 43 and 44A are perspective views of a cleaning module according to another aspect of the present invention, FIG. 44B is a side sectional view of the cleaning module of FIG. 44A, FIGS. 45 and 46 are side views of an alternative painting apparatus, and FIG. 47 is an end view of part of an alternative roller assembly.

With reference to FIGS. 1 to 21, there is shown a painting apparatus 10 comprising a paint module 20 and a paint applicator assembly in the form of a roller assembly 50.

The paint module 20 is a plastic housing comprising a main body 21 having a liquid supply section 22, and a cleaning section 26. The supply 22 and cleaning 26 sections are separated by an upstanding centre wall 15 of the main body 21.

The paint module 20 includes a supply section closure 23 which is attached to the upstanding wall 15 by a hinge 17, and a cleaning section closure 33 which is also attached to the upstanding wall 15 by a hinge 19 (both hinges being shown simplified in FIG. 4 but more detailed in FIGS. 2 and 6).

The supply section closure 23 includes a motor 60 (shown as a broken line in FIGS. 1 and 4) which is located between a lower wall 62 and an upper wall 64 of the closure 23.

The cleaning section closure 33 includes a motor 70 (shown as a broken line in FIGS. 1 and 4) which is located between a lower wall 66 and an upper wall 68 of the closure 33, the motor being drivingly connectable via a gear drive 35 (shown as a broken line in FIG. 6) to part of the roller assembly 50 when the closure 33 is closed.

The cleaning section closure 33 also includes a spring loaded projection 31 which acts against the roller assembly 50 when the closure 33 is closed (see below).

The cleaning section closure also includes an aperture 151 (FIGS. 1 and 6).

The paint module 20 further includes a rigid plastic supply container 43 which is releasably housed in the liquid supply section 22, and a rigid plastic receiving container 45 which is releasably housed in the cleaning section 26 (FIGS. 4A and 5).

The rigid plastic supply container 43 defines a supply chamber 47, and the rigid plastic receiving container defines a receiving chamber 49. The supply chamber 47 is able to house a paint container 110 (containing paint 150), or a cleaning fluid such as water 160 (see below).

It can be seen from FIGS. 3 to 5 that the supply container 43 and the receiving container 45 can be removed from the main body 21 of the paint module 20. This enables the supply container 43 to be filled with the cleaning fluid before a cleaning cycle is commenced, and the receiving container to be emptied of a combination of cleaning fluid and paint after the cleaning cycle has been completed (see below).

The supply section closure 23 includes a through aperture 25 which allows a dip-tube assembly 80 to be inserted therethrough and into either paint in the paint container 110 housed below in the receiving chamber 48, or cleaning fluid in the receiving chamber 49 below, depending on whether the paint or cleaning cycle is required.

The supply section closure 23 also includes a removable cover 82 hingeably moveable between an open position which allows insertion of the dip-tube assembly 80, and a closed position when the dip tube assembly 80 has been inserted (as shown in FIG. 1). The removable cover 82 includes a raised portion 84 to allow a connecting tube 120 (see below) to pass under the cover 82 and be connected to the roller assembly 50 when the cover 82 is in the closed position.

The supply section closure 23 also includes a drive gear 90 which connects the motor 60 to a drive gear 130 of the dip-tube assembly 80 (FIG. 8) when the dip-tube 80 is inserted into the aperture 25 allowing the gears 90,130 to engage with each other (FIGS. 7, 7A, 7B and 8).

With reference to FIGS. 7, 7A, 7B and 8, the dip-tube assembly 80 comprises a sealed cylindrical housing 85 having a gear pump 86 located at its lower free end. The cylindrical housing 85 includes a lower casing 92 to retain the gear pump 86. The lower casing 92 includes a plurality of holes (not shown) which are sized so as to prevent particles of greater than 2 mm passing into the gear pump.

The gear pump 86 comprises two meshed gears 140,142. Gear 140 is connected via drive shaft 89 to gear 130 such that rotation of gear 90 which is connected to the motor 60 causes the two meshed gears 140,142 to rotate.

Rotation of the gears 140,142 causes either paint 150 or cleaning fluid 160 (depending on whether the cleaning cycle or paint cycle is activated) to be sucked up through the holes in the casing 92, and into the tube 88 via a hole 93 and channel arrangement 95. Tube 88 is fluidly connected via a connector 97 (shown as a broken continuation lines in FIGS. 7A and 8) to tube 120, and therefore paint is driven from the paint container to the roller assembly 50.

The tube 120 has an internal diameter of 6 mm.

Such a dip-tube arrangement differs from that known in the prior art where the pump is positioned at the top of the dip-tube and the paint is sucked up from the paint container rather than being driven from the paint container when the gears are submerged in the paint as in the present invention. This enables more efficient priming of the roller assembly with paint due to the fact that the gear pump 86 does not have to suck up a quantity of air in the tube 88, but simply has to drive paint through the tube 88. Gear pumps operate more efficiently when driving a higher viscosity liquid such as paint or water as opposed to air.

The pump of the present invention has a pressure capacity, by which is meant the maximum pressure that the pump can apply to liquid leaving its outlet. This pressure is dissipated along the length of the tubing to achieve viscous flow. For specification purposes it is assumed that any applicator head (e.g. roller) in the whole device has been removed from the end of the tube, so that the pressure of the liquid leaving the tube is close to atmospheric pressure. In this situation the measured pressure at the pump outlet is also the pressure difference between the start and end of the tube. The pressure capacity is in the range 0.5 to 7.5 barg which allows flow rates through the tubing in the range 30 to 4000 ml/min to be achieved by suitable choice of tubing length and internal bore diameter in the ranges 2 to 8 m and 4 to 8 mm respectively.

In the embodiment above, the tube is 4 m long with a 6 mm internal bore diameter, and supplies paint at 200 ml/min. At the upper end of the quality Rotothinner viscosity specification (8 Poise) this requires a pump outlet pressure of about 4.1 barg.

The paint module 20 includes an electronic control unit 24 (only shown in FIG. 1) which sets the appropriate flow rate for the paint or cleaning fluid depending on whether the paint or cleaning cycle has been selected, and the direction of paint flow during the paint cycle (see below).

The paint module 20 includes a storage tray 180 which sits upon a rim 181 of the receiving container 45 (FIG. 5).

The storage tray 180 includes a well 182 which is shaped and dimensioned such that it can receive part of the roller assembly 50 (see below).

The well 182 includes seven drainage holes 183 (all of which are only shown in FIG. 13) spaced equally on its inner surface 185 along its lowest point. The holes have a diameter of approximately 5 mm. Two further identical drainage holes 183 are positioned on the inner surface 185 at each end of the well, and circumferentially spaced either side of the lowest point of the well.

The well 182 includes a series of ribs 184 which project radially inwardly from the inner surface 185. The ribs 184 include an inclined portion 186 and a vertical portion 187 as shown in FIGS. 14 and 15. The ribs 184 are arranged either side of a centre line C such that the inclined portions 186 on either side oppose each other.

The well 182 also includes rectangular drainage slots 188 positioned on the inner surface 185 between alternate pairs of projecting ribs 184 on each side of the centre line C (FIG. 15). The drainage slots 188 are positioned between the vertical portions 187 of the ribs 184. Each slot is approximately 5 mm in height by 25 mm in length. The slots 188 are angularly spaced from the seven drainage holes positioned at the lowest point by approximately 90 degrees.

The well 182 includes two locating slots 189 to receive the roller assembly 50.

The storage tray 180 includes a hole 191 which can receive a paint pot 192. The paint pot 192 has a rim 193 which enables the pot 192 to rest upon an upper surface 194 of the storage tray 180 (FIGS. 11 and 12).

The storage tray 180 includes a paint brush receiving section 172 (FIG. 9), for housing a paint brush 173 (FIGS. 6, 10, and 12).

The paint brush receiving section 172 has a brush end 174 which includes a plurality of holes 176 to allow any paint on the brush to drain through the holes an into the receiving container 45.

The storage tray 180 can also be adapted such it can receive additional paint applicators such as a paint pad or a mini-roller (not shown).

The paint pot 192 can be used to store paint to enable other applicators to be loaded, for example, the paint brush.

The roller assembly 50 includes a handle 51 which is releasably attachable to a roller head 53 via a coupling 55 (FIG. 5). The handle 51 can optionally include a sensor (not shown) which detects the presence of the roller head such that the paint flow rate is adjusted accordingly.

The handle 51 includes a switch 57 which is wirelessly connected to the control unit 24 to start and stop paint flow as required.

The roller cage or head 53 comprises a primary housing 61, a secondary roller housing 63, a distribution plate 65, a secondary roller 67 and a primary roller 69 (FIG. 16).

The primary housing 61 includes two end portions 75 connected by a back portion 77.

Each end portion includes a lug 71 which locates inside slots 189 of the well 182 to enable the roller assembly 50 to locate on the storage tray 180. Each end portion 75 includes an inner surface 81 upon which is positioned a slot 83. Each lug 71 includes an internal through hole 112.

The back portion 77 includes two holes 89.

The primary housing 61 includes two springs in the form of metal tabs 73 (shown schematically in FIG. 16) mounted on an inside surface 79 of the back portion 77.

The secondary roller housing 63 is defined by a hemicylindrical channel 91 which is congruent with two flared portions 93. The channel 91 defines a chamber 99 (FIG. 17).

The channel 91 includes a through hole 97 at a mid point along its length L.

The hemicylindrical channel 91 is dimensioned so that it can receive the secondary roller 67 (see below).

The secondary roller housing 63 has two projections 87 which extend from the hemicylindrical channel 91 away from the flared portions 93.

The secondary roller housing 63 includes two pins 85.

The projections 87 locate inside holes 89 on the primary housing 61, and pins 83 locate inside the slots 83 on the primary housing 61 to enable the secondary roller housing 63 to locate on the primary housing 61.

When the secondary roller housing 63 is housed inside the primary housing 61, the secondary roller housing is biased towards the roller 69 as a result of the two springs 73 mounted on the primary housing 61 and acting on the housing 63, and a flexible coupling 95 which physically connects the primary housing 61 and the secondary roller housing 63, and fluidly connects the chamber 99 to the coupling 55. The secondary roller housing is biased away from the primary housing such that the flared portions 93 are in contact with a roller sleeve 113 (see below).

The distribution plate 65 is a rectangular strip which locates inside a recess 101 in the chamber 99 between the channel 91 and the secondary roller 67 (FIG. 20).

The distribution plate 65 includes a central hole 102, and a series of rectangular slotted holes 103,105,107,109,111 having equal lengths $L_1$, $L_2$, $L_3$, $L_4$, and $L_5$. The purpose of the distribution plate 65 is to provide an even distribution of paint onto the secondary roller and hence onto the roller sleeve to prevent banding of paint when it is applied to a surface. The distribution plate would ideally be a single long tapered slot, however, such a long slot is unstable in moulding, and therefore a series of slots having increasing widths (hole 103 being the narrowest, hole 111 being the widest) enables both a stable moulding to be produced and minimise banding.

The secondary roller 67 is cylindrical with hemispherical ends 112 (FIG. 21) and is dimensioned such that it is a close fit inside the chamber 99. The fit between the secondary roller and channel 91 is governed by the thickness of the paint film.

The secondary roller is designed to only rotate when both the flow of paint behind the secondary roller is sufficient to lift the secondary roller off the distribution plate, and when the roller sleeve is rotating. The secondary roller will rotate at a speed that depends on the balance of the friction from the roller sleeve as a driving force and the viscous drag from the film of paint that it is sitting on in the channel 91, i.e. only partially dependent on the roller sleeve speed, and not fully dependent as is the case for secondary rollers that are coupled via drive pulleys to the roller sleeve. The viscous drag depends on the thickness of the paint film. The friction of the roller will depend on roller speed and spring biasing force. In this way the system can balance itself irrespective of paint flow rate and roller speed.

It has been found that using ball or hemispherical ends reduces dripping when compared to secondary rollers having straight ends because the hemispherical ends draw paint back into the chamber 99. The hemispherical ends also give a smooth transition to the roller which helps prevent dripping.

The secondary roller 67 is made of ABS which is dimensionally stable so that it does not warp and jam in the channel 91, and sufficiently wear and chemically resistant for use with paint.

The primary roller 69 includes a roller sleeve 113 having a first end cap 115 and a second end cap 116. Each end cap 115,116 has a lug 114 extending outwardly therefrom. The first end cap 115 includes an integrated gear 117.

The roller sleeve 113 is made of a flock material and has an internal diameter of 38 mm, and an external diameter of 60 mm, giving a pile length of 11 mm. The roller has a longitudinal length of 218.3 mm. The longitudinal free ends of the roller sleeve are also bevelled or tapered inwardly to minimise dripping compared to a roller sleeve where both the ends are parallel to each other, and perpendicular to the longitudinal axis of the roller sleeve.

The roller 69 is secured onto the primary housing 61 by engagement of the lugs 114 with the internal through hole 112 on the lugs 71.

The roller assembly is assembled as shown in FIG. 16 by inserting the distribution plate 65 in the recess 101 of the channel 91, then locating the secondary roller housing inside the primary housing, positioning the secondary roller inside the chamber 99, and finally locating the roller 69 in the primary housing such that the secondary roller is retained floating in the chamber 99 by the roller sleeve.

It can be seen from FIGS. 16 and 17 that the secondary roller 67 is not secured to any part of the roller assembly and is therefore essentially floating inside chamber 99. The secondary roller is acting as a hydrodynamic bearing inside the chamber 99. This has the advantage that when the paint is not flowing into the chamber 99, the secondary roller sits in the chamber and provides a pressure drop to prevent paint dripping.

It can also be seen that paint flows around the secondary roller and not from inside it as is the case with known secondary rollers.

Furthermore, the hemicylindrical channel 91 fully envelopes the secondary roller 67 to prevent paint dripping from the ends of the secondary roller 67.

The flared portions 93 of the channel 91 partially surround and are biased against the roller sleeve such that they collect excess paint and feed it back onto the roller sleeve or into the chamber 99. Consequently there is less tendency for paint to drip from the roller sleeve.

The secondary roller housing 63 in which the secondary roller 67 locates is biased towards the roller sleeve. Secondary rollers which are on a fixed axes do not allow for variation in roller sleeve diameter and tolerance. Allowing both the secondary roller and the channel 91 to float significantly minimises dripping.

With reference to FIGS. 22 to 39, there is shown the paint container 110.

The paint container 110 includes a main body 200, a collar 204, a handle 201, and a closure 207 (FIG. 22).

The main body 200 has an inwardly tapering neck portion 202 and an upstanding rim portion 203. The upstanding rim portion 203 has a rim 210 which defines a container aperture 212.

The rim 210 has an internal web 214 projecting radially inwardly. The web 214 includes an aperture 216 which is dimensioned such that it is a close fit around the cylindrical housing 85 of the dip-tube assembly 80 so as to remove excess paint from the cylindrical housing 85 when it is removed from the paint container 110 (FIG. 24).

Figure 8:
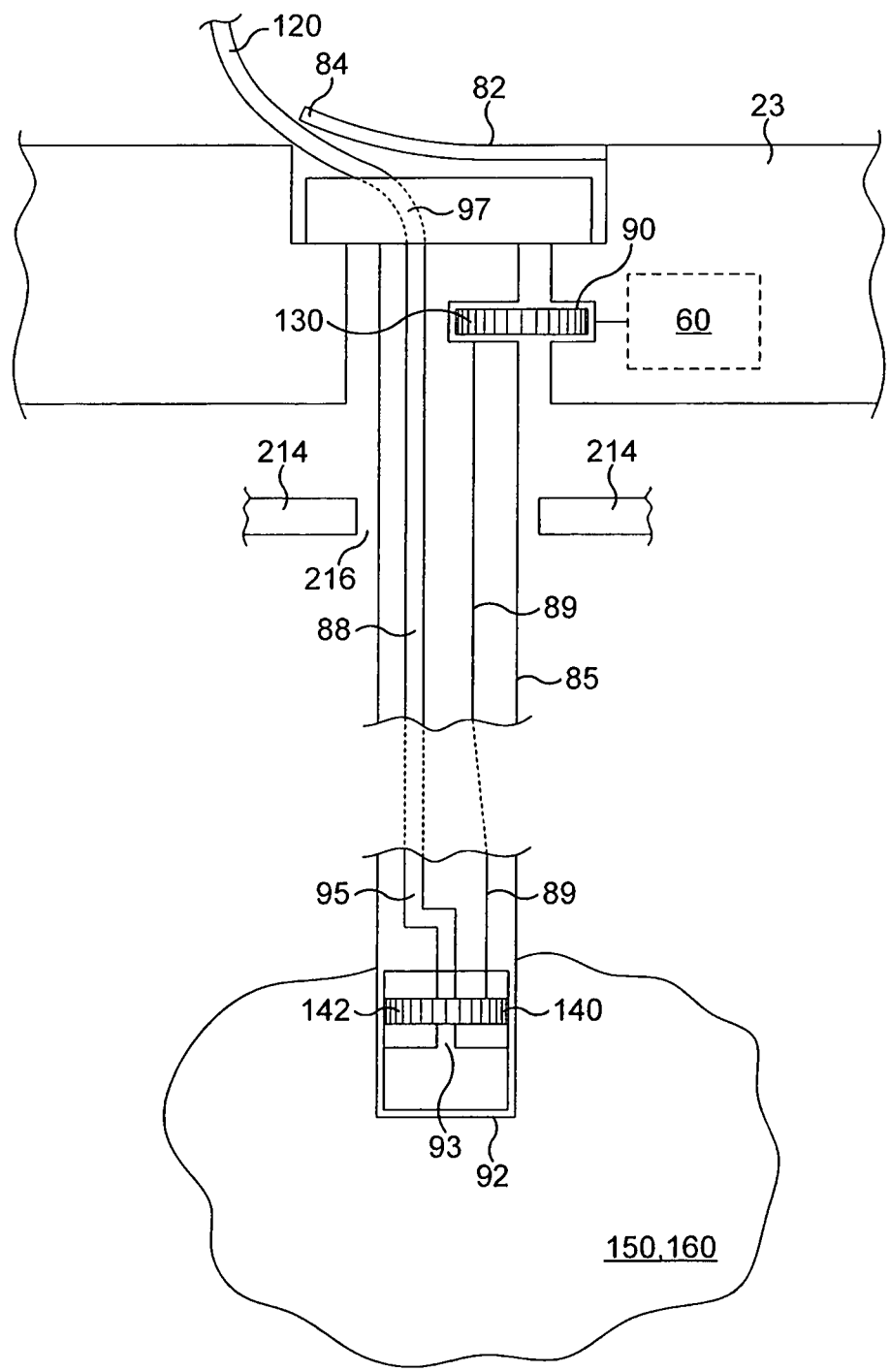
Figure 9:
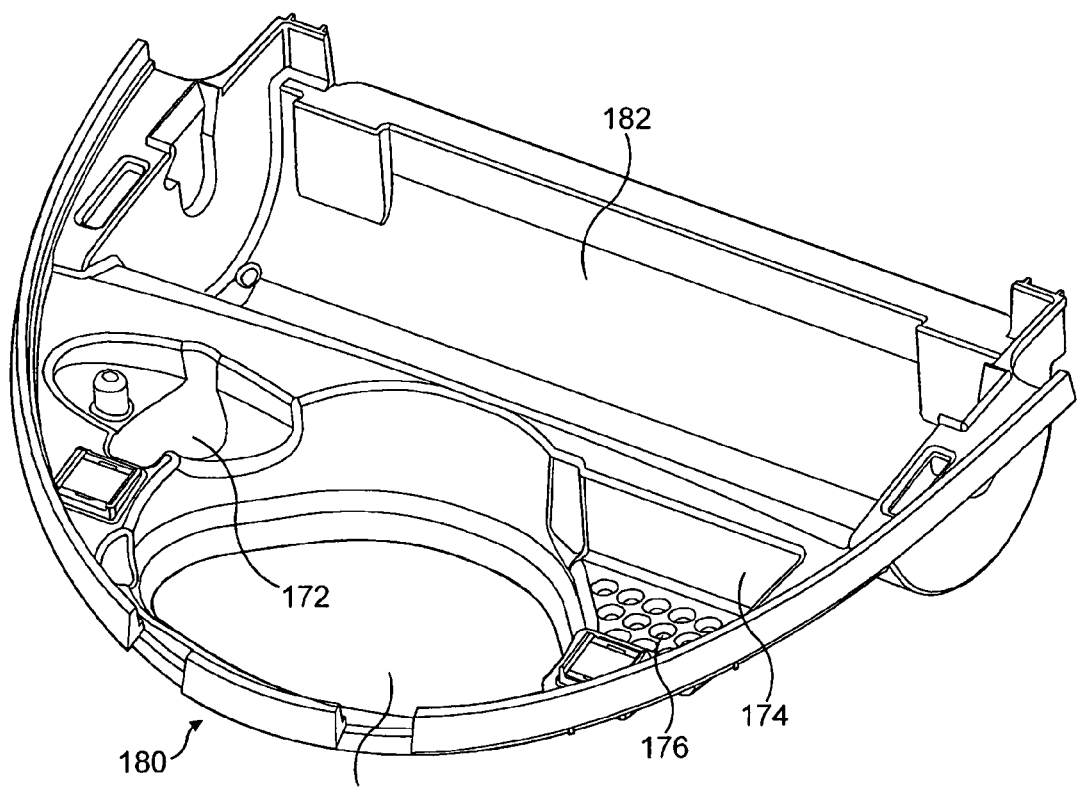

The aperture 216 is also positioned relative to the paint container 110 such that when the paint container 110 is housed within the paint module 20, it is vertically aligned with the aperture 25 on closure 23 such that the cylindrical housing can be inserted through both apertures with subjecting the housing to stress due to misalignment (FIG. 8).

Figure 24:
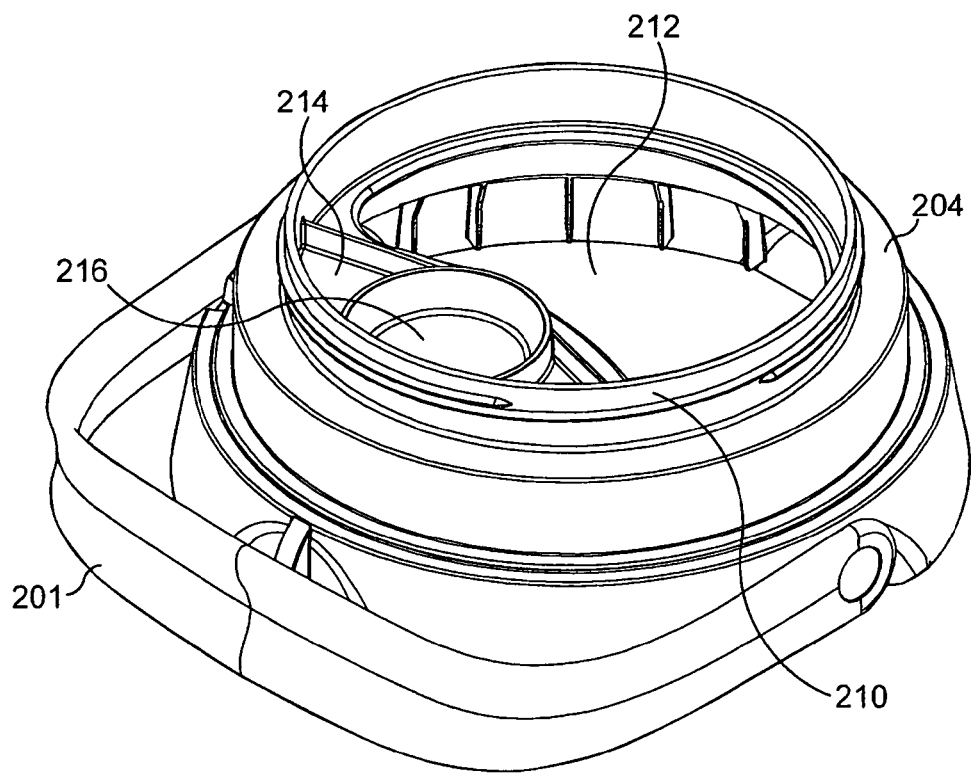
Figure 25:
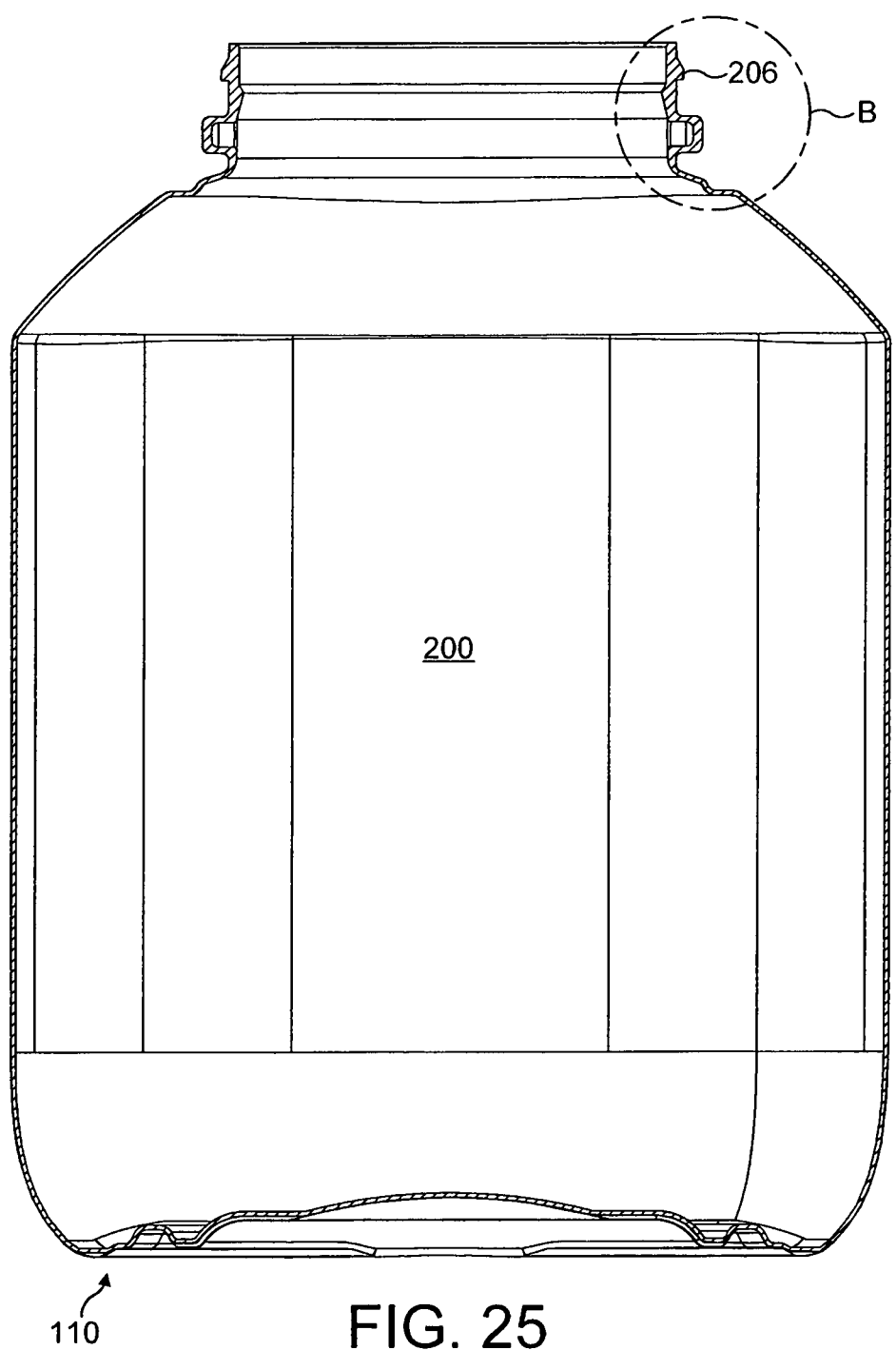
Figure 26:
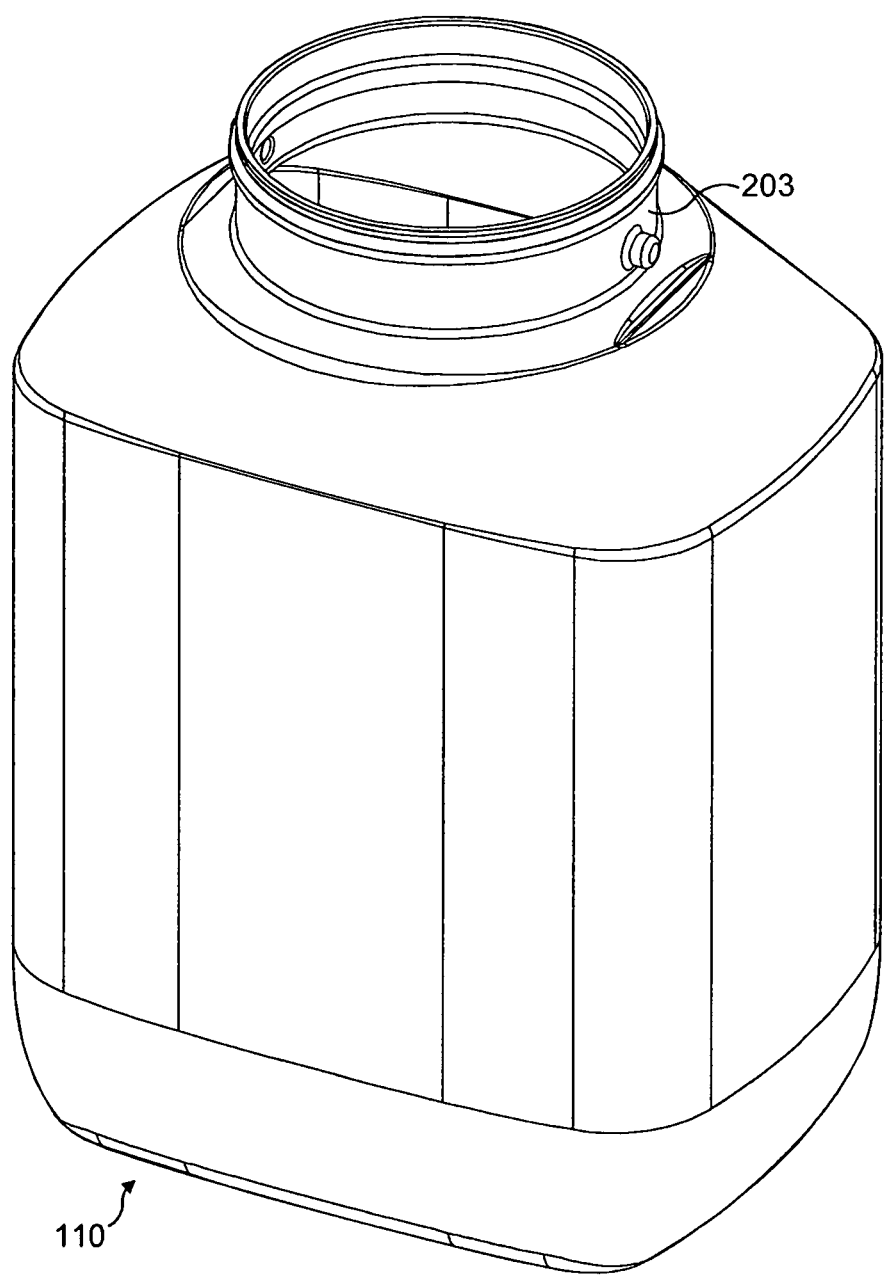
Figure 27:
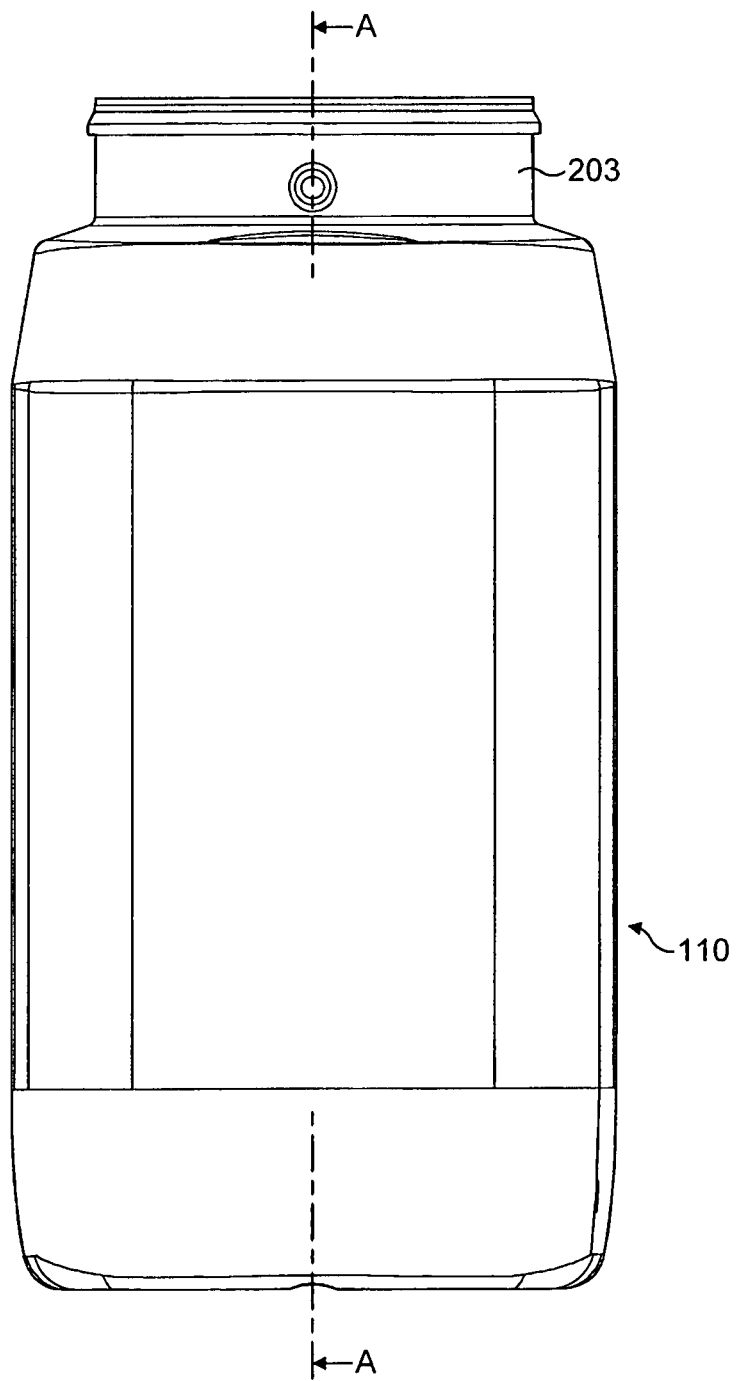

It can be seen from FIG. 24 that the aperture 216 is offsett from the centre of the container aperture 212, therefore enabling access to paint in the container with a paint brush.

The collar 204 snap-fits onto the neck main body 202 by engagement of a main body projection 206 with a collar projection 208 such that the collar 204 is vertically and rotationally retained on the main body.

The collar 204 also includes a screw thread 214 onto which closure 207 is screwed via a corresponding closure screw thread 215 so as to close and seal the paint container 110.

The container aperture 212 can also be temporarily sealed using a tear-off foil seal 220.

The handle 201 includes inwardly projection lugs 230 with internal through holes 232 which locate on lugs 222 positioned on the upstanding rim portion 203 to secure the handle 201 to the main body. It can be seen from FIG. 30 that the handle 201 is also vertically retained on the main body of the paint container by the collar 204 by virtue of engagement between the lugs 230 and a lower surface 234 of the collar.

The handle is also horizontally retained on the main body by virtue of engagement between an increased diameter radial portion 236 on the lugs 230 and an inside surface 238 on the collar 204.

Thus it will be appreciated that the closure can be screwed onto the collar to form a subassembly, followed by snap-fitting of the subassembly onto the main body of the paint container. This is advantageous on production lines where snap-fit assembly is installed. The closure can then be screwed off and on again via the screw threads which is a more user friendly process compared to conventional closures which snap-fit directly onto the container main body.

With reference to FIG. 36A, the paint container 110 has a base 500 which includes a convex recess 502. The effect of the recess is to raise the paint level inside the container so that less paint is left in the container when it falls below the level of the gear pump in the dip-tube assembly. The additional effect of the recess 502 is to enable the closure of an identical container to locate inside the recess to improve stacking stability.

With reference to FIGS. 37 to 39, the collar 204 has a second container feature in the form of an upper surface 300, and a first container feature in the form of a recess 302.

The supply section closure 23 includes a first detection switch 190 and a second detection switch 192 projecting from its lower surface 62. Both switches 190,192 are housed within separate hollow housings 304 and movable between open and closed positions. Both switches are biased towards the container (downwardly when viewing FIG. 37) via a spring (not shown). The first and second detection switches 190,192 interact with the first and second container features as described below.

It is also possible to include taggants in the paint itself which can communicate with a sensor in the paint module to confirm the presence of the correct paint and hence correct paint container.

The paint module 20 also has four switches, a paint switch 400, a pause switch 402, a drain switch 404, and a cleaning switch 406 to activate the required mode (FIG. 1).

The painting apparatus 10 operates as follows:

The user (not shown) selects the paint container 110 (FIG. 22). The paint container 22 is supplied with paint 150.

Known paints cannot be used with the painting apparatus of the present invention because we have found problems arise in the operation of the apparatus. In particular, before painting can begin, the tubing connecting the paint container to the roller assembly must be primed with paint. This requires paint to be transferred from the container using a pump. The tubing is typically from 2 to 8 metres long with an internal diameter of from 0.4 to 0.8 cm internal diameter.

Attempts to use known paints with the apparatus of the invention reveal that such known paints either cannot be pumped at all or can only be pumped at a very low flow rate. At best this is inconvenient making the painting process very slow, while at worse, the paint cannot be transferred to the roller for application to the substrate. This is thought to arise from the pressure loss associated with the flow of the paint through the tubing. Whilst a larger pump could overcome the pressure drop, it would make the apparatus more expensive and cumbersome in use. Suitable, conveniently sized pumps have pressure capacities (the maximum pressure that the pump can apply to paint leaving its outlet) of from 0.5 to 7.5 barg.

Diluting known paints with carrier liquid, such as water in the case of emulsion paints, enables the paints to flow at acceptable rates of from 30 to 4000 ml/minute. However, although this overcomes the priming problem, the diluted paints cause the roller to skid during the application process, the paint to sag and poor appearance of the dried paint film as well as poor opacity, the latter requiring more coats of paint to obliterate the substrate.

Surprisingly, we now provide paint formulations that can be pumped at flow rates of from 30 to 4000 ml/minute using pumps of pressure capacities of from 0.5 to 7.5 barg without the problems of the known paints.

According to another aspect of the present invention there is provided a liquid architectural paint composition comprising
i) a first thickener having Newtonian flow
ii) a second thickener having shear thinning flow
wherein the high shear viscosity of the paint is from 0.12 to 0.18 Pa·s and the medium shear viscosity is from 0.5 to 0.8 Pa·s.

By medium shear viscosity is meant the viscosity when measured at $160 \, s^{-1}$ and high shear viscosity when measured at $10000 \, s^{-1}$. The significance of measuring the viscosity at these two shear rates is that the former reflects the shear rate that the paint is exposed to in the tubing and the latter approximates to the shear rate in the pump assembly.

The medium shear viscosity is measured using a Rototh-inner viscometer and the high shear viscosity using a Cone and Plate viscometer as described below.

Architectural coatings are for application to surfaces found in or as part of buildings such as interior and exterior walls, ceilings, window frames, doors and door frames and radiators.

By aqueous is meant that at least 50% of the continuous phase is water, preferably from 75 to 100%, more preferably from 85 to 100%, even more preferably from 95 to 100% and most preferably it is 100%. Any balance is preferably water compatible organic solvent or mixture of solvents.

Above a medium shear viscosity of 0.8 Pa·s, the paint cannot be pumped to the roller, whereas below 0.5 Pa·s the paint drips from the roller and the paint tends to sag unless great care and/or very many thin coats are applied. Preferably, medium shear viscosity is from 0.55 to 0.70 Pa·s and most preferably from 0.6 Pa·s to 0.7 Pa·s.

At a high shear viscosity above 0.20 Pa·s, the paint is very difficult to spread, feeling 'sticky' to the user. Below 0.12 Pa·s the roller skids during application. Preferably, the high shear viscosity is from 0.13 to 0.19 Pa·s, more preferably from 0.14 to 0.18 Pa·s and most preferably from 0.15 Pa·s to 0.17 Pa·s.

The first thickener type exhibiting Newtonian flow can be selected by making a composition according to the thickener composition test described below and comparing the viscosities at the two shear rates. The ratio of the medium shear viscosity:high shear viscosity must be less than 1.8, preferably from 0.8 to 1.8, more preferably from 0.6 to 1.6.

Suitable examples of the first thickener type fall into two thickener families, namely associative thickeners and low molecular weight (less than 100000 daltons) water soluble polymers. Suitable examples of the first family include the hydrophobically modified ethoxylated urethane (HEUR) type such as Acrysol RM1020, Acrysol RM2020 and Acrysol RM5000 available from Rohm and Haas. Other HEUR types include Borchi Gel 0434, Borchi Gel 0435 and Borchi Gel 0011 available from Borchers. Also included in this first family are hydrophobically modified polyacetal polyethers such as Aquaflow NHS 300 and Aquaflow NHS 310 available from Aqualon/Hercules. Suitable examples of the second family include cellulosic ethers such as hydroxyethylcellulose, sodium carboxymethyl cellulose, methyl cellulose, ethylhydroxyethyl cellulose, hydroxypropyl cellulose; synthetic water-soluble polymers such as polyethylene oxide, poly vinyl alcohol and polyacrylamide.

The associative thickeners are preferred, more preferably hydrophobically modified polyacetal polyether and most preferred is Aquaflow NHS 300.

Similarly, the second thickener, having shear thinning flow, can be selected by making a composition according to the thickener composition test described below and comparing the viscosities at the two shear rates. The ratio of the medium shear viscosity:high shear viscosity must be greater than 1.8, preferably from 1.8 to 40, more preferably from 5 to 40.

Suitable examples of the second thickener type can be found in a number of thickener families. These include high molecular weight (greater than 100000 daltons) water soluble polymers, smectic clays, metal chelates, polymer microgels and associative thickeners.

Suitable examples of the high molecular weight water soluble polymers include carboxymethyl cellulose such as Blanose-available from Aqualon/Hercules, Finnfix-available from CP Kelco and Celflow; and hydroxyethyl cellulose such as Natrosol 250 MR and Natrosol 250 HHR-available from Aqualon/Hercules. Other cellulosics include methyl cellulose, ethylhydroxyethyl cellulose and, hydroxypropyl cellulose. Other suitable such water soluble polymers include the synthetic polymers including polyethylene oxide, polyvinyl alcohol and polyacrylamide; and the natural and synthetic gums such as guar, alginates carrageenan, xanthan and hydroxypropyl guar available from Rhodia.

Suitable examples of the smectic clays include montmorillonite available as Bentone EW from Elementis, bentonite, attapulgite and laponite Suitable examples of the metal chelates include titanium carboxylate salts such as Tilcom, Vertec AT23, Vertec AT34 and Vertec AT 35 available from Johnson Matthey.

Suitable examples of the polymer microgels are the alkali swellable emulsions (ASE) such as Acrysol ASE 60 and Acrysol TT935 available from Rohm and Haas.

Suitable examples of the associative thickeners include the HEUR type such as Acrysol SCT-275, Acrysol RMB, Acrysol RM 825, Acrysol RM 895 available from Rohm and Haas; Tafigel PUR 40, Tafigel PUR 41, Tafigel PUR 50, Tafigel PUR 60 Tafigel PUR 61 available from Munzig; Borchi Gel 0620, Borchi Gel 0621, Borchi Gel 0622, Borchi Gel 0625, Borchi Gel 0626, Borchi Gel PW 25, Borchi Gel LW44, Borchi Gel 0024, Borchi Gel WN50S, Borchi Gel L75N, Borchi Gel L76 available from Borchers; the hydrophobically modified ethoxylated urethane alkali swellable emulsions (HEURASE) such as UCAR DR-73 available from Rohm and Haas; the hydrophobically modified alkali swellable emulsions (HASE) such as Acrysol TT615 available from Rohm and Haas, Aquaflow ALS 400 available from Aqualon.Hercules, Tafigel AP20 available from Munzig; and the hydrophobically modified polyacetal polyether Aquaflow NLS 200, Aquaflow NLS 205, and Aquaflow NLS 210 available from Aqualon.Hercules.

The associative thickener types are preferred, more preferably the HEUR type and most preferably it is Acrysol TT615.

Preferably the paint comprises from 0.05 to 1.0, more preferably from 0.1 to 0.5, yet more preferably from 0.15 to 0.30 and most preferably from 0.15 to 0.20 wt % of the first type of thickener and from 0.1% to 1.0, more preferably from 0.15 to 0.8, yet more preferably from 0.2 to 0.6 and most preferably from 0.2 to 0.5 wt % of the second type. All based on the non vol thickener calculated on the total formulation It is essential that both types of thickener are present otherwise skidding and/or sagging and dripping will occur.

Thickener Composition Test

A thickener composition was made using the ingredients listed below.

|  | g |
|---|---|
| Water (1) | 1219.69 |
| Dispex N40 | 15.25 |
| Disponil A1580 | 38.12 |
| Benzyl alcohol | 79.28 |
| Water (2) | 554.40 |
| Acrylic copolymer emulsion | 1682.90 |
| Axilat DS 910 | 277.20 | ener used in this test is adjusted until the medium shear viscosity measured on the Rotothinner viscometer is at least 0.05 Pa·s and the high shear viscosity reading on the cone and plate viscometer is at least 0.02 Pa·s.

Viscosity Measurements

High Shear Viscosity

This is measured using a Cone and Plate viscometer operating at 10000 $s^{-1}$

The viscometer used is a model CPI (available from Sheen Instruments, Kingston, UK) fitted with a cone suitable for operation from 0 to 0.5 or 0 to 10 Pa·s. The measurement is carried out in accordance with ISO standard test method BS EN ISO 2884-1:2006, BS 3900-A7-1:2006 Paints and varnishes "Determination of viscosity using rotary viscomenters. Cone and plate viscomneter operated at high shear rate. The test is carried out at 25° C.+/−0.2° C.

Medium Shear Viscosity

This is measured using a Rotothinner model 455N 0-1.5 Pa·s Digital Rotothinner from Sheen Instruments. The test is carried out using a 250 ml can at 25° C.

The invention will now be illustrated by reference to the paint example below.

| Description | Supplier | Function | Weight_% |
|---|---|---|---|
| Water (Mains) |  |  | 16.00 |
| Dispex N40 | Ciba | pigment dispersant | 0.20 |
| Disponil A1580 | Cognis | wetting agent | 0.50 |
| Benzyl Alcohol |  | Coalescing solvent | 1.04 |
| Dispelair CF823 | Blackburn Chemicals | Defoamer | 0.10 |
| Microdol H600 | Omya | Dolomite | 11.60 |
| Polwhite B | Imerys | Kaolin | 4.10 |
| Tioxide TR92 | Huntsman-Tioxide | TiO2 | 15.00 |
| Water (Mains) |  |  | 5.00 |
| Natrosol Plus Grade 330 PA | Hercules/Aqualon | Low Shear thickener | 0.30 |
| Rocima V189 | Thor | Biocide | 0.07 |
| Water (Mains) |  |  | 2.50 |
| Acrylic Copolymer Emulsion |  | Binder | 24.28 |
| AXILAT DS 910 | Hexion | Binder | 4.00 |
| Water (Mains) |  |  | 7.94 |
| Ropaque (Tm) Ultra E | Rohm & Haas | opacifier | 4.71 |
| Dispelair CF823 |  | Defoamer | 0.16 |
| Ammonia 910 |  | stabiliser | 0.05 |
| Acrysol SCT-275 | Rohm & Haas | Shear thinning thickener | 1.55 |
| Aquaflow NHS 300 | Hercules/Aqualon | Newtonian thickener | 0.90 |

Medium shear viscosity 0.65 Pa · s
High shear viscosity 0.15 Pa · s

-continued

|  | g |
|---|---|
| Water (3) | 550.04 |
| Ropaque Ultra E | 326.20 |
| Thickener | Variable |
| Ammonia 910 | Variable |

The acrylic copolymer emulsion is methyl methacrylate/2 ethyl hexyl acrylate copolymer having a glass transition temperature of 5° C. Revacryl IA available from Synthomer is a suitable alternative.

Axilat 910 is a copolymer emulsion dispersion of composition styrene:butyl acrylate:acrylic acid ratio of 47:47:6 by weight. Available from Hexion.

The ingredients are added in the order shown and adjusted to pH 8 using ammonia. Since thickeners vary greatly in the magnitude of the viscosity they generate, the amount of thick- The user unscrews the closure 207 from the collar 204, and peals off the foil seal 220 so as to expose aperture 216 on the collar 204.

The user opens the supply closure 23 of the paint module 20, and inserts the paint container 110 such that it locates inside the plastic supply container 43.

The user then closes the closure 23 of the paint module 20.

With the paint container 110 in the correct position, switch 190 locates inside recess 302, such that the switch 190 is in the closed position, and switch 192 abuts the uppermost surface 300 of the collar 204 such that it is in the open position (FIG. 37). With the switches 190,192 in this configuration, and only in this configuration, the painting apparatus can operate to supply a flow of paint to the roller assembly.

If the paint container is incorrectly inserted, or a paint container which does not have the corresponding features on the collar is present such that the switch 190 is not in the closed position, and/or switch 192 is not in the open position then paint flow is prevented (FIG. 38).

Thus, essentially, a double detection system operates which requires both switches to be in the correct position before paint can flow.

If the paint container is correctly inserted such that paint can flow, but the cleaning mode is selected instead of the painting mode, then a warning sounds which prevents the cleaning mode from operating.

If the paint container is incorrectly inserted such that paint will not flow, then a warning is given so that the user is prevented from inserting the dip-tube, which by virtue of the paint container being incorrectly inserted, will not be in aligned with the aperture through which it is supposed to pass through.

If the user selects the painting mode without the paint container being present then a warning is given The switch logic can also be adapted to detect the absence of the paint container such that only the cleaning cycle can be activated.

The dip-tube assembly 80 is then inserted through aperture 25 of the closure 23, and through aperture 216 of the collar 204 such that the gear pump 86 is submerged in the paint.

Tube 120 (which is attached to handle 51) is then connected to the roller assembly via coupling 55. When the handle 51 is connected to coupling 55, a paint path is defined between paint in the paint container, and the roller sleeve 113.

When the user wishes to start painting, the paint switch 400 is activated, and the user depresses switch 57 on handle 51. Providing the roller sleeve is in engagement with the surface, for example a wall, to be painted, paint will flow to the roller sleeve. As the user rotates the roller sleeve against the wall, paint flows over the secondary roller 54 and onto the roller sleeve. Paint will not flow unless the control unit 24 detects either a change in pressure on the roller sleeve (via a sensor (not shown)), or optionally, rotational movement of the roller sleeve (via a rotational sensor on the roller assembly). Therefore the user simply has to remove the roller sleeve from the surface being painted to prevent paint flow, irrespective of whether the switch 57 is released. This prevents too much paint arriving at the roller sleeve when the user is not painting.

Suitable pressure sensors include piezoelectric as well as more exotic materials that change conductivity when stressed.

Movement sensors include accelerometers or simpler arrangements of a switch with a heavy free end. Displacement sensors include strain sensors as well as optical sensors.

To detect rotational movement it is possible to mount a magnet on the primary roller, and a sensor on the primary housing 61. The sensor could be a hall effect or simple reed switch.

In an alternative embodiment, pressure or rotational movement sensors need not be used, with the user simply relying on the switch 57 to control paint flow to the roller sleeve.

When the switch 57 is activated, paint will continue to be fed to the roller sleeve. As soon as the switch 57 is released, the control unit instructs the motor 60 to reverse the flow direction, and suck paint back through the tube 120 so as to remove any excess paint from the chamber 99, and thereby minimise dripping of paint from the roller assembly. The flow is reversed for a period of time sufficient to remove excess paint from the chamber, typically, under one to two seconds.

It is also possible to reverse the paint flow when either a pressure change, or lack of rotational movement of the primary roller is detected.

It will be appreciated that even if the primary roller has stopped rotating, it is possible to supply paint by activation of the switch 57. In such an embodiment, the supply of paint to the primary roller is not prevented by lack of rotational movement of the primary roller.

It will also be appreciated that the paint flow can be prevented if a pressure change on the primary roller is detected, and that the paint flow can be reversed when the primary roller is removed from the surface to be painted, but still potentially rotating. This allows the consumer to stop painting, and rely on the pressure change to prevent paint flow, but still reverses the paint flow irrespective of whether or not the primary roller is rotating, i.e. the paint flow reversal is not dictated only by the rotation of the primary roller.

The paint flow rate is between 150 and 250 ml/min.

If the user wishes to use an alternative applicator, then the roller assembly 50 can be disconnected from the handle 51, and a different applicator, for example, a paint pad or mini roller can be connected.

When the user has finished painting, the roller sleeve is cleaned as follows:

Firstly, the cleaning section closure 33 is opened so as to expose the storage tray 180 (FIG. 6).

The roller assembly 50 is positioned such that the roller sleeve 112 locates inside the well 182 (FIGS. 5, 6, and 39). When the cleaning section closure 33 is closed, the roller sleeve 112 is enveloped by the closure 33 (by virtue of it having a internal profile the same as that of the roller sleeve), and the well 182. The sprung loaded projection 31 abuts against the back 77 of the primary housing 61 to further push the secondary roller 67 against the roller sleeve 112 to increase the friction between the roller sleeve and the secondary roller such that more paint is removed (FIG. 39, with the secondary roller removed for clarity).

When the cleaning section closure 33 is closed, the gear 35 positioned on the closure engages with the gear 117 on the roller sleeve 112 such that motor 70 can rotate the primary roller during the cleaning cycle.

The user then presses the drain switch which returns unused paint from the tube 120 to the paint container.

The dip-tube assembly 80 is removed from the paint module, and then the paint container 110 is removed from the supply container 43. The supply container 43 is then filled with water, and the dip-tube assembly is then inserted into the container 43 such that it can then pump water to the roller assembly.

Activation of the cleaning cycle causes water to flow at a rate of 1000 ml/min from the supply container 43 to the roller sleeve following the same path as when the paint flows to the roller sleeve. The flow rate of 1000 ml/min is chosen as the rate at which the diameter of tube (6 mm) results in a Reynolds number that is inside the turbulent flow region, which has the effect of enhancing the cleaning process in the tube.

The cleaning cycle also commences rotation of the roller sleeve 112. As the roller sleeve rotates, the secondary roller acts against the roller sleeve to causing a mixture of paint and water to be driven off. It has been found that an initial delay, typically 30 seconds, in rotating the roller sleeve after the water flows, or rotating the roller sleeve slowly, increases the removal rate of paint from the roller sleeve.

Typically the cleaning cycle takes 10 minutes.

A more detailed cleaning cycle is given in the chronological sequence below.

1. 5 s (Pump on; Roller forward (anti-clockwise when viewing FIG. 17)
2. 40 s (Pump on; Roller stop)

3. Cycle 1:
   a. 15 s (Pump on; Roller forward)
   b. 71.5 s (Pump on 3.5 s/Pump off 2 s; Roller forward), repeated 13 times to total 71.5 s
4. Cycle 2:
   a. 15 s (Pump on; Roller backward)
   b. 71.5 s (Pump on 3.5 s/Pump off 2 s; Roller forward), repeated 13 times to total 71.5 s
5. Cycle 3:
   a. 15 s (Pump on; Roller backward)
   b. 71.5 s (Pump on 3.5 s/Pump off 2 s; Roller forward), repeated 13 times to total 71.5 s
6. Cycle 4:
   a. 15 s (Pump on; Roller backward)
   b. 71.5 s (Pump on 3.5 s/Pump off 2 s; Roller forward), repeated 13 times to total 71.5 s
7. Cycle 5:
   a. 15 s (Pump on; Roller backward)
   b. 71.5 s (Pump on 3.5 s/Pump off 2 s; Roller forward), repeated 13 times to total 71.5 s
8. Cycle 6:
   a. 15 s (Pump on; Roller backward)
   b. 71.5 s (Pump on 3.5 s/Pump off 2 s; Roller forward), repeated 13 times to total 71.5 s
9. 15 s (Pump on; Roller backward)

During the initial pumping process it has been found that the release of the high viscosity paint under pressure can be quite dramatic and can cause a mess internally to the cleaning section. This effect can be enhanced by the rotation of the roller. Initially then the primary roller is held static. The effect of the rotational speed of rotation of the primary roller during the remainder of the cleaning cycle is not thought critical. The rotational speed should be high enough to ensure that the secondary roller sweeps the surface of the primary roller sufficient times to improve cleaning. However, a high speed with sufficient torque to turn the primary roller will result in a more expensive motor and higher power consumption. A rotational frequency of around 0.2 to 1 Hz is a suitable range.

It has also been found that pulsing the water flow increases the rate of paint removal for a given amount of water by temporarily reversing the water flow as the system de-pressurises during the pauses in the cleaning cycle. This agitation has the effect of reducing the amount of water required to clean.

It has also been found that the direction of the roller rotation is important, specifically, that the direction should be anti-clockwise (when viewing FIG. 17), as this prevents dirty water from damming up against the upper surface of the secondary roller.

The direction of primary roller rotation reverses at times during the cleaning cycle: The secondary roller is slightly loose in its channel to allow rotation. As the roller rotates the secondary roller is biased against one side of its channel by this motion. This causes the water to flow predominantly out of one side of the secondary roller. As a result the other side of the secondary roller does not clean as well. This roller motion also causes the secondary roller channel to rock in its mounting biasing one side against the primary roller surface and lifting the other. As a result one side of the secondary roller channel is washed clean by the primary roller while the other side can still retain paint residue. Reversing the direction of rotation periodically during the cleaning cycle counters these effects.

The rectangular drainage slots 188 act as weirs. The holes 183 in the well 182 allow the mixture of paint and water to drain into the receiving chamber 49. The number and size of the holes are controlled to cause the water level to increase in the well 182 such that the roller sleeve is sitting in water as it rotates. This has been found to improve the cleaning performance. The slots 188 prevent overflow of water should holes 183 become blocked.

It has also been found that it is possible to remove paint from the primary roller without enveloping the roller inside the well/lid combination, i.e. the roller is rotated in an open recess, suggesting that the primary mechanism for cleaning is the flow of clean water across the roller and the mangling action of the secondary roller.

When the roller is clean, the receiving chamber 49 can be emptied of the paint and water mixture.

When the user wishes to commence painting again, the paint container is reinserted into the paint module, and the process recommences as described above.

The cleaning section also includes a sensor (not shown) to detect the presence of the roller assembly inside the well. Unless the roller assembly is detected, the cleaning cycle cannot be commenced The paint module has to pump water at a high flow rate and paint at a lower flow rate at a higher torque. These two requirements are difficult to achieve with a single motor and gearbox, and therefore the motor includes a gear change which allows it to operate at its most efficient speed in the painting and cleaning modes. This also removes the requirement for costly and unreliable speed control of the motor.

In an alternative embodiment, the paint module can include a detector which detects the speed or change in current draw of the motor depending on whether paint or water or none of paint or water is being pumped. Suitable modes (cleaning or painting) can then be selected based on the fluid detected. The detector could also allow the detection of running out of paint or water with the appropriate warnings given.

With reference to FIG. 40 there is shown a roller assembly 50 and handle 51 identical to the embodiment above, with the addition of an extension handle 800 which fluidly connects the dip-tube to the roller assembly. The extension handle 800 includes a handle 810 having a paint flow switch 820. Switch 820 operates in the same way as switch 57 to stop and start paint flow via a wireless connection (not shown). The additional handle 810 is required due to the fact that handle 51 and the switch 57 is now remote from the user. The extension handle connects onto handle 51 in a known way, for example, a snap-fit connection, and the roller assembly fits onto the extension handle in the same way.

With reference to FIG. 41 there is shown an alternative applicator in the form of a paint pad 600.

The paint pad 600 has pad body 610 and an applicator surface 620 which is kite shaped. The applicator surface 620 has a closed cell foam structure with apertures (not shown) which fluidly connect the surface 620 to conduit 655. The conduit 655 can be connected to the handle 51 in the same way as the roller assembly can be connected to the dip-tube.

It will be appreciated that the surface 620 does not need to absorb a significant amount of paint compared to manually loaded paint pads, and hence the body 610 does not require a conventional open foam structure. The closed cell foam structure enables easier cleaning since less paint is stored.

With reference to FIG. 42 there is shown an alternative painting apparatus 910 comprising a closure 920 having an integrated dip-tube assembly 901 as described above. The closure 920 fits onto a standard paint container 930 (via a screw fit, clip-fit, or snap-fit for example) such that the dip-tube is submerged in the paint contained inside the paint container. Since the dip-tube assembly and closure are integrated, the motor in the closure is directly connected to the gear pump at the lower free end of the dip-tube, with no requirement for meshing of gears as described in the embodiment above where the dip-tube is removable from the paint module lid. The closure is connected to the roller assembly 950 as in the above embodiment.

With reference to FIGS. 43, 44A and 44B there is shown an alternative cleaning module 970 onto which the closure 920 fits. The cleaning module 970 comprises two distinct chambers, a supply chamber 972 which houses cleaning fluid, and a waste chamber 974. A removable cover 980 sits inside, and rests upon the module 970. The cover 980 includes a well 976 which is positioned above the waste chamber 974. The well 976 can receive a roller assembly 950, and has an aperture 973 to allow a paint and cleaning fluid mix to drain into the waste chamber below.

The cover 980 also includes an aperture 975 positioned above the supply chamber, which enables insertion of the dip-tube into the cleaning fluid such that cleaning fluid can be supplied to the roller assembly.

The roller assembly also has a primary roller 952 with an integrated gear wheel 953 which engages with a motor and drive (not shown) no the closure 920 when positioned on the module 970 to rotate the primary roller during the cleaning cycle.

The closure 920 can also be adapted to envelop the primary roller in combination with the well 976.

The cleaning fluid is supplied to the exterior surface of the primary roller. The primary roller can optionally include a secondary roller as described above to provide the mangling effect, or the mangling effect can be created by interaction with a secondary roller type feature that is integral with the closure 920.

With reference to FIGS. 45 and 46 there is shown an alternative painting apparatus 1010 comprising a paint module which can receive either a paint container 1030, or a cleaning module 1070. The cleaning module is identical to that of FIGS. 43, 44A, and 44B.

The paint module 1020 includes a hingeable closure 1025 which includes the dip-tube assembly and associated motor. The dip-tube assembly supplies paint or cleaning fluid to a roller assembly (not shown) in the same way as described above.

An alternative primary roller 1169 includes a closed cell structure 1170 with an outer removable thin layer 1172, such as a microfibre layer which has a low tendency to absorb paint (FIG. 47). The closed cell structure can be used due to the fact that the primary roller does not need to absorb large quantities of paint because paint is fed continuously to the exterior surface. The microfibre layer is chosen to give the required paint finish. The advantage of the removable layer is that it can either be disposed of, or cleaned relatively easily when compared to washing the complete primary roller.

The above embodiments describe a roller assembly with an integrated secondary roller. It would be possible to provide a stand alone cleaning module having a secondary roller or mangle which is not part of the roller assembly, but is arranged on the cleaning module such that when the roller assembly is received in the cleaning module, the secondary roller or mangle acts against the primary roller to squeeze paint from the primary roller during cleaning.

For the avoidance of doubt, the present invention relates to the components described above, i.e. dip-tube, pump, paint container, roller assembly, cleaning module and paint module, both individually, and in combination.

The invention claimed is:

1. A painting apparatus comprising a paint module, an applicator assembly having an applicator surface, and a pump, the paint module having a container receiving section, the applicator assembly being fluidly connectable to the container receiving section such that the pump can supply liquid contained in the container receiving section to the applicator assembly, wherein the apparatus can operate in a painting cycle where the container receiving section receives a paint container with a supply of paint such that the paint can be supplied to the applicator assembly, and in a cleaning cycle where the container receiving section receives a liquid in the form of a cleaning fluid, such that the cleaning fluid can be supplied to the applicator assembly;

wherein the applicator assembly is a roller assembly comprising a primary roller; and wherein the primary roller includes a roller gear wheel which engages with a corresponding module gear wheel on the paint module such that the primary roller can be rotated during the cleaning cycle.

2. The painting apparatus according to claim 1 wherein the roller assembly further comprises a secondary roller, the secondary roller being positioned relative to the primary roller such that paint or cleaning fluid supplied to the roller assembly passes over part of the secondary roller before being fed onto an exterior surface of the primary roller.

3. The painting apparatus according to claim 2 wherein the paint or cleaning fluid supplied to the roller assembly passes over part of an exterior surface of the secondary roller.

4. The painting apparatus according to claim 2 wherein the roller assembly comprises a primary housing which is fixed to the primary roller, and a secondary roller housing which is flexibly attached to the primary housing such that the secondary roller housing is biased towards the primary roller to cause the secondary roller housing to float between the primary housing and the primary roller.

5. The painting apparatus according to claim 4 wherein the secondary roller is provided inside a channel of the secondary roller housing such that the secondary roller floats in and is retained inside the channel by the exterior surface of the primary roller.

6. The painting apparatus according to claim 1 wherein the paint module includes a cleaning section for storing both the applicator assembly and a combination of the cleaning fluid and paint removed from the applicator assembly when the apparatus is operating in the cleaning cycle.

7. The painting apparatus according to claim 6 wherein the cleaning section includes a removable receiving container.

8. The painting apparatus according to claim 6 wherein the paint module includes a storage tray which sits above the cleaning section, the storage tray able to receive the applicator.

9. The painting apparatus according to claim 8 wherein the storage tray includes a well which can partially receive the primary roller.

10. The painting apparatus according to claim 9 wherein the well includes a plurality of drainage holes to allow the combination of cleaning fluid and paint to drain into the cleaning section.

11. The painting apparatus according to claim 9 wherein the module includes a cleaning section lid, which in the closed position envelops the primary roller in combination with the well such that cleaning fluid supplied to the roller sleeve is retained in close proximity to the roller sleeve.

12. The painting apparatus according to claim 11 wherein the lid includes a projection which abuts against the secondary roller housing when the lid is in the closed position to increase the friction between the secondary roller and the primary roller such that more paint and cleaning fluid is removed.

13. The painting apparatus according to claim 11 wherein the module gear wheel is located on the cleaning section lid, and engagement between the roller gear wheel and module gear wheel causes the primary roller to rotate during the cleaning cycle.

* * * * *

UNITED STATES PATENT AND TRADEMARK OFFICE
CERTIFICATE OF CORRECTION

PATENT NO.        : 8,632,271 B2
APPLICATION NO.   : 12/596409
DATED             : January 21, 2014
INVENTOR(S)       : Walcot et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this
Twenty-second Day of September, 2015

Michelle K. Lee
*Director of the United States Patent and Trademark Office*